United States Patent
Ferguson et al.

(10) Patent No.: US 12,491,639 B2
(45) Date of Patent: Dec. 9, 2025

(54) FRAMEWORK FOR ROBOTIC ASSISTANTS

(71) Applicant: Nuro, Inc., Mountain View, CA (US)

(72) Inventors: David Ferguson, San Francisco, CA (US); Jiajun Zhu, Palo Alto, CA (US)

(73) Assignee: NURO, INC., Mountain View, CA (US)

( * ) Notice: Subject to any disclaimer, the term of this patent is extended or adjusted under 35 U.S.C. 154(b) by 196 days.

(21) Appl. No.: 18/212,613

(22) Filed: Jun. 21, 2023

(65) Prior Publication Data

US 2024/0001556 A1 Jan. 4, 2024

Related U.S. Application Data

(60) Provisional application No. 63/356,897, filed on Jun. 29, 2022.

(51) Int. Cl.
*B25J 9/16* (2006.01)

(52) U.S. Cl.
CPC .......... *B25J 9/1689* (2013.01); *B25J 9/1661* (2013.01)

(58) Field of Classification Search
CPC .................. B25J 9/1661; B25J 9/1689; G05B 2219/40174
See application file for complete search history.

(56) References Cited

U.S. PATENT DOCUMENTS

| | | | | |
|---|---|---|---|---|
| 2020/0356951 | A1* | 11/2020 | Cristache | G06Q 10/10 |
| 2020/0404221 | A1* | 12/2020 | Trundle | G06V 20/52 |
| 2021/0046650 | A1* | 2/2021 | Deyle | G05D 1/0214 |
| 2021/0048829 | A1* | 2/2021 | Deyle | G05D 1/0274 |
| 2021/0251568 | A1* | 8/2021 | Shayne | G16H 40/67 |
| 2021/0311480 | A1* | 10/2021 | Yang | G05B 13/0265 |
| 2021/0342479 | A1* | 11/2021 | Schluntz | H04L 63/107 |
| 2022/0331973 | A1* | 10/2022 | Taniguchi | G16H 40/67 |
| 2023/0222757 | A1* | 7/2023 | Beith | H04W 12/02 |
| | | | | 382/103 |
| 2023/0252687 | A1* | 8/2023 | Zhang | G06V 10/806 |
| | | | | 382/159 |

* cited by examiner

*Primary Examiner* — Wade Miles
*Assistant Examiner* — Zachary Joseph Wallace
(74) *Attorney, Agent, or Firm* — Edell, Shapiro & Finnan, LLC

(57) ABSTRACT

According to one aspect, a method includes obtaining a request to remotely operate a robotic assistant, the robotic assistant including at least one sensor configured to collect data associated with an environment around the robotic assistant. The method also includes identifying a first teleoperations system to remotely operate the robotic assistant in response to the request, the first teleoperations system being one of a plurality of teleoperations systems, and assigning the first teleoperations system to remotely operate the robotic assistant. At least one privacy-related instruction is implemented with respect to the first teleoperations system.

20 Claims, 19 Drawing Sheets

304

FRAMEWORK FOR ROBOTIC ASSISTANTS

CROSS REFERENCE TO RELATED APPLICATION

This application claims priority to U.S. Provisional Application No. 63/356,897, filed on Jun. 29, 2022, and entitled "FRAMEWORK FOR ROBOTICS ASSISTANTS," the contents of which are incorporated herein by reference in their entirety.

TECHNICAL FIELD

The disclosure relates to robotic assistants such as home robots. More particularly, the disclosure relates to a framework which supports the control of robotic assistants using teleoperations.

BACKGROUND

The use of robots to perform tasks in different environments is increasing. For example, home robots are used to perform tasks in homes, warehouse robots are used to perform tasks in warehouses, and hospital robots are used to perform tasks in hospitals. As the use of such robotic assistants grows, the ability to efficiently use the robotic assistants is becoming more important.

BRIEF DESCRIPTION OF THE DRAWINGS

The disclosure will be readily understood by the following detailed description in conjunction with the accompanying drawings in which.

DESCRIPTION OF EXAMPLE EMBODIMENTS

General Overview

Figure 1:
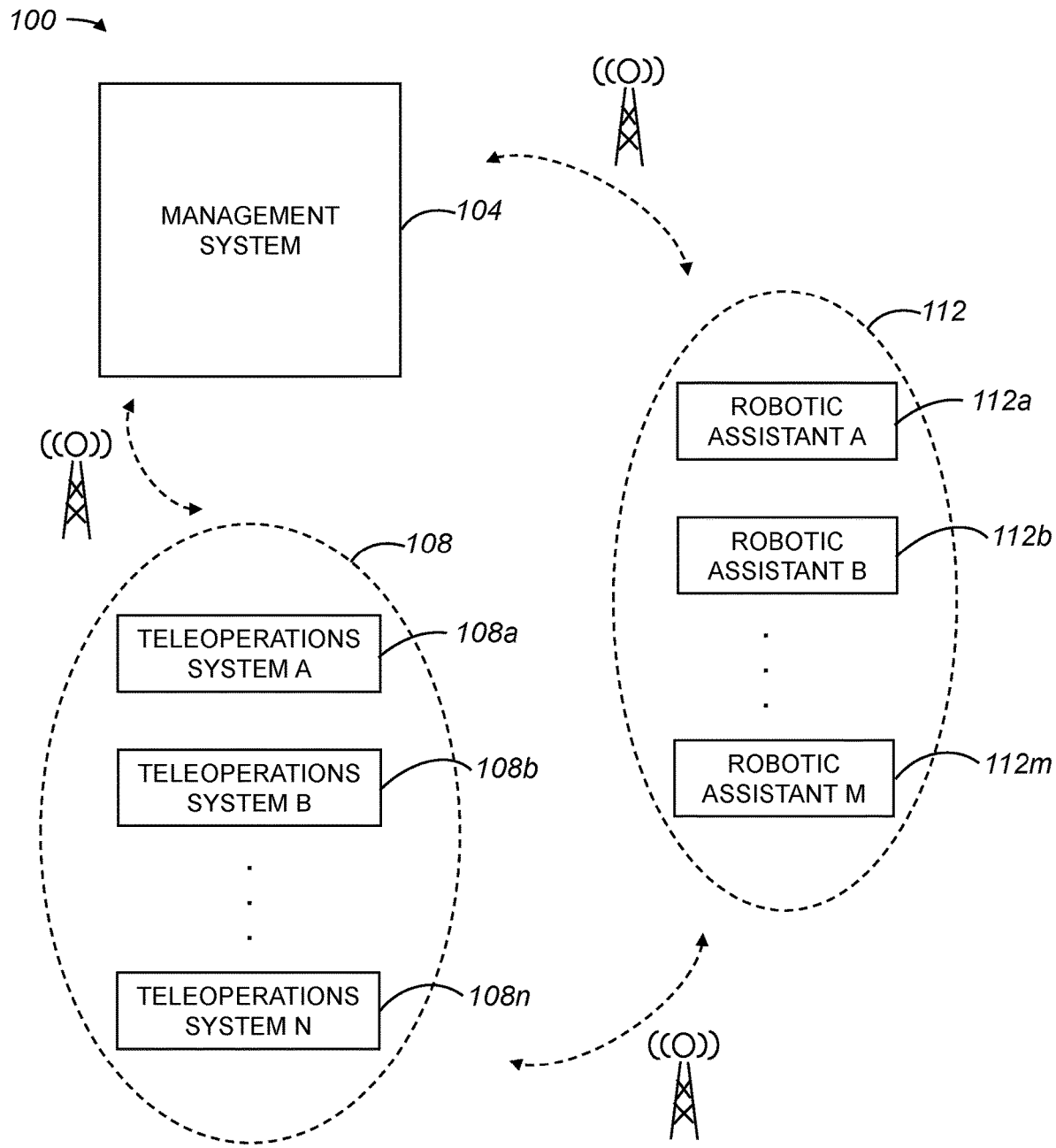
FIG. 1 is a diagrammatic representation of a framework which includes robotic assistants which may be operated by teleoperations systems in accordance with an embodiment.

In accordance with one embodiment, a method includes obtaining a request to remotely operate a robotic assistant, the robotic assistant including at least one sensor configured to collect data associated with an environment around the robotic assistant. The method also includes identifying a first teleoperations system to remotely operate the robotic assistant in response to the request, the first teleoperations system being one of a plurality of teleoperations systems, and assigning the first teleoperations system to remotely operate the robotic assistant. At least one privacy-related instruction is implemented with respect to the first teleoperations system. The sensor configured to collect data is configured to obtain at least one image of the environment, and the at least one privacy-related instruction is an instruction relating to a rendering of the image on a visual interface of the first teleoperations system.

According to another embodiment, logic encoded in one or more tangible non-transitory, computer-readable media for executed, when executed, is operable to obtain a request to remotely operate a robotic assistant, the robotic assistant including at least one sensor configured to collect data associated with an environment around the robotic assistant. The logic is also operable to identify a first teleoperations system of a plurality of teleoperations systems to remotely operate the robotic assistant in response to the request, to assign the first teleoperations system to remotely operate the robotic assistant, and to implement at least one privacy-related instruction with respect to the first teleoperations system.

In accordance with still another embodiment, a framework includes a plurality of robotic assistants, a plurality of teleoperations systems, and a management system. The plurality of robotic assistants includes a first robotic assistant located at a first location associated with an owner of the first robotic assistant, and the plurality of teleoperations systems includes a first teleoperations system. The management system is arranged to obtain at least one request to remotely operate the first robotic assistant and arranged to assign the first teleoperations system to remotely operate the first robotic assistant and to provide the first teleoperations system with at least one privacy-related instruction associated with the first robotic assistant.

Robotic assistants may be remotely operated by teleoperations systems. The robotic assistants and the teleoperations systems may be part of a framework which enables a customer, e.g., an owner or possessor of a robotic assistant, to request that a teleoperations system to be assigned to remotely operate a robotic assistant to perform a task. Such a framework may include a management system which identifies a suitable teleoperations system to assign to a task. Some frameworks may also include robotic assistants which may autonomously perform requested tasks, as for example when a task is relatively uncomplicated and may be readily performed by a robotic assistant that is operating autonomously.

DESCRIPTION

Robotic assistants, e.g., robots, may operate within predefined spaces to perform tasks. The predefined spaces may include outdoor locations and indoor locations. For example, a robotic assistant that is a home robot may operate indoors within a home to perform tasks such as household chores. Similarly, a robotic assistant that is a warehouse robot may perform tasks in a warehouse, and a robotic assistant that is a hospital robot may perform tasks in a hospital. An owner or possessor of a robotic assistant may control the operation of the robotic assistant, as for example by using a remote control when the owner is in the vicinity of the robotic assistant.

To increase the efficiency with which robotic assistants may be used, robotic assistants may be remotely operated by a teleoperator using a teleoperations system. By enabling robotic assistants to be remotely operated by teleoperators, the robotic assistants may be used to complete tasks at substantially any time. For example, while an owner of a home robotic assistant is not home, the owner may request that a teleoperations system be used to manipulate the home robotic assistant to perform a task. Such a robotic assistant and a teleoperations system may be part of an overall framework that allows teleoperations systems to be substantially assigned to perform a task by remotely operating the robotic assistant. Within such an overall framework, a pool of teleoperations systems and teleoperators may be available to remotely operate robotic assistants to perform tasks.

Referring initially to FIG. 1, a framework or platform which includes robotic assistants that may be operated by teleoperations systems will be described in accordance with an embodiment. A framework 100 includes a management system 104, a pool of robotic assistants 112, and a pool of teleoperations systems 108. Management system 104, pool of robotic assistants 112, and pool of teleoperations systems 108 may be in communication across a network, e.g., a wireless and/or wired network.

Management system 104 is configured to effectively manage the scheduling of teleoperations systems 108a-n of pool 108 to remotely operate robotic assistants 112a-m of pool 112. For example, management system 104 may identify a suitable teleoperations system 108a-n to perform a requested task using a robotic assistant 112a-m. The task may be requested by a customer, who may be an owner and/or a possessor of a robotic assistant 112a-m. One embodiment of management system 104 will be discussed below with reference to FIG. 3.

Each robotic assistant 112a-m may be capable of being controlled, e.g., remotely though a teleoperations system 108a-n, to perform a task identified by an owner or possessor of each robotic assistant 112a-m. An owner or possessor may communicate with management system 104 to request that a particular robotic assistant 112a-m perform a task. In response to the request to perform a task, management system 104 may identify one of teleoperations systems 108a-n to effectively accommodate the request. When a teleoperations system 108a-n is effectively assigned by management system 104 to remotely control a robotic assistant 112a-m, teleoperations system 108a-n may communicate substantially directly with robotic assistant 112a-m.

Figure 2:
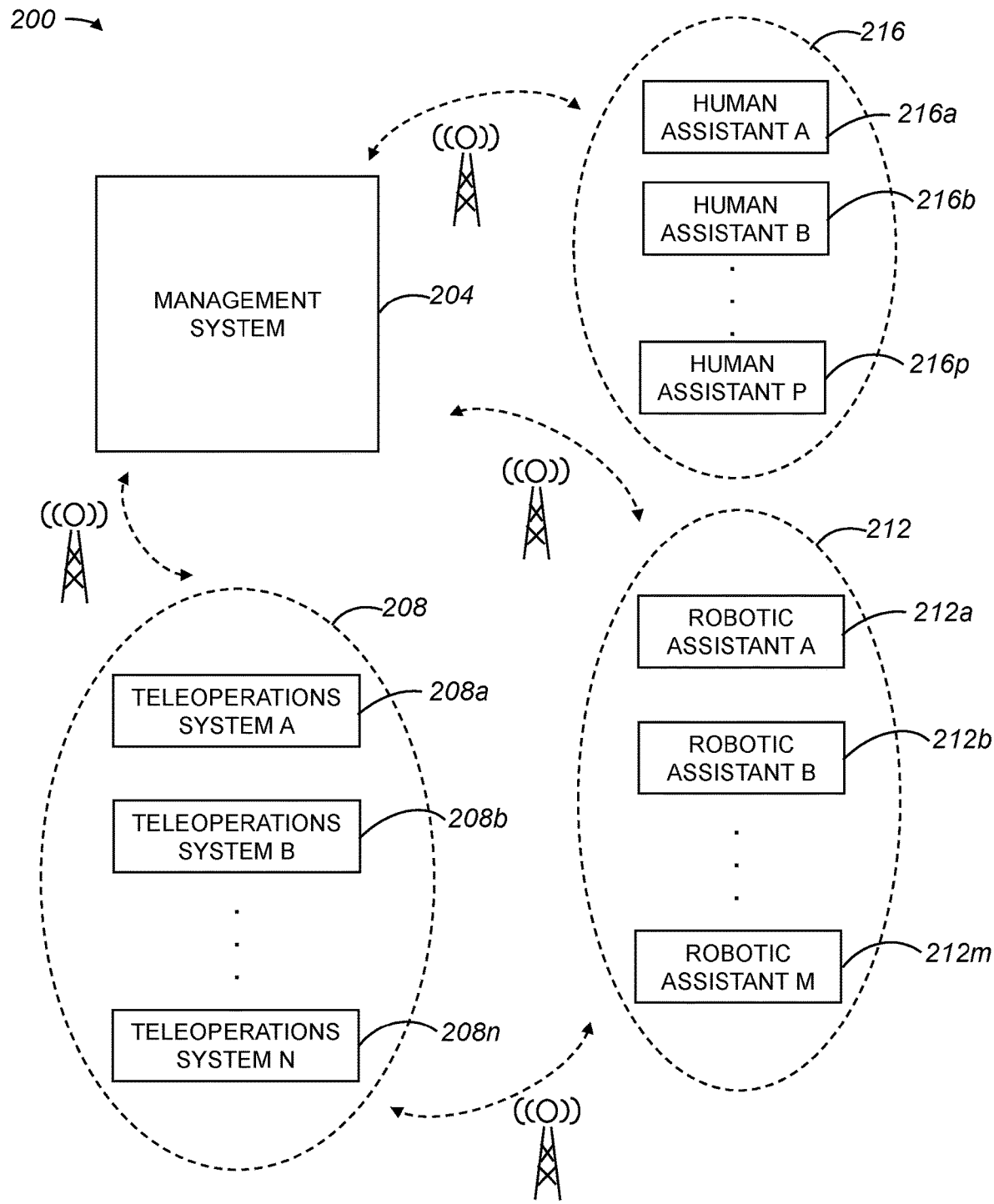
FIG. 2 is a diagrammatic representation of a framework which includes human assistants and robotic assistants which may be operated by teleoperations systems in accordance with an embodiment.

An overall framework that includes robotic assistants which may be remotely operated using teleoperations systems may also include human assistants who are available to perform tasks at the behest of a customer. Within such a framework, a customer who owns or possesses a robotic assistant may request that a task be performed, and a management system within the framework may either assign a teleoperator to remotely operate a robotic assistant to perform a task at a location, or assign a human assistant to perform the task at the location. FIG. 2 is a diagrammatic representation of an overall framework which includes human assistants and robotic assistants which may be operated by teleoperations systems in accordance with an embodiment. A framework 200 includes a management system 204, a pool of robotic assistants 212, a pool of teleoperations systems 208, and a pool of human assistants 216. Management system 204, pool of robotic assistants 212, pool of teleoperations systems 208, and pool of human assistants 216 may be in communication across a network, e.g., a wireless and/or wired network. It should be appreciated that human assistants 216a-216p may be in possession of devices such as cellular phones and/or computers which allow human assistants 316a-p to communicate within framework 200. For example, management system 204 may communicate within human assistants 216a-p by sending messages to smartphones possessed by human assistants 216a-p.

When a customer, e.g., an owner of a robotic assistant 212a-m, requests that a task be completed, management system 204 may determine whether to complete the task using a robotic assistant 212a-m or a human assistant 216a-p. In one embodiment, the task may be such that a robotic assistant 212a-m would not be suited to perform the task and, as such, a human assistant 216a-p may be dispatched to perform the task. When management system 204 determines that one of teleoperations systems 208a-n to effectively accommodate the request, a teleoperations system 208a-n is effectively assigned by management system 204 to remotely control a robotic assistant 212a-m.

Figure 3:
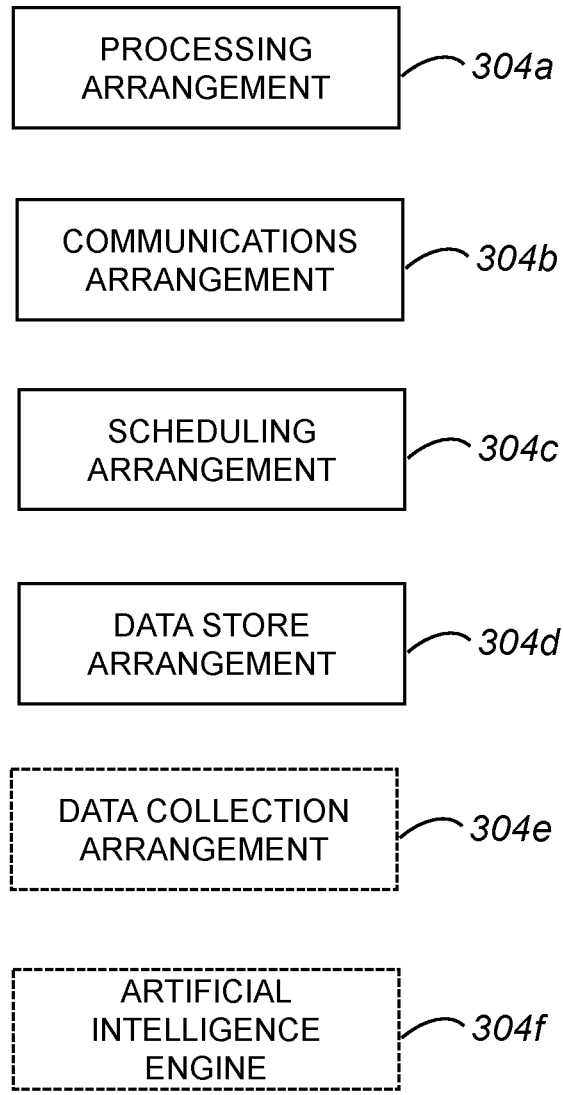
FIG. 3 is a block diagram representation of a management system of a framework in accordance with an embodiment.

Referring next to FIG. 3, a management system that is part of a framework such as framework 100 of FIG. 1 or framework 200 of FIG. 2 will be described in accordance with an embodiment. A management system 304, which may be embodied on one or more servers, includes a processing arrangement 304a, a communications arrangement 304b, a scheduling arrangement 304c, a data store arrangement 304d, an optional data collection arrangement 304e, and an optional artificial intelligence engine 304f.

A processing arrangement 304 is configured to process data or information obtained on, or provide by, communications arrangement 304b. In one embodiment, processing arrangement 304 is configured to execute software code devices or logic associated with other components or management system 304.

Communications arrangement 304b is configured to enable management system 304 to communicate within a framework that includes robotic assistants, human assistants, and/or teleoperations systems. The communications may include wireless communications such as Bluetooth communications, Wi-Fi communications, cellular communications, 3G/4G/5G communications, LTE communications, etc. It should be appreciated that communications may also include wired communications.

Scheduling arrangement 304c is configured to enable management system 304 to identify available assets to provide service to customers. For example, scheduling arrangement 304c may identify available teleoperations systems, as well as teleoperators, to perform tasks using robotic assistants as requested by customers. Scheduling arrangement 304c may also identify available human assistants to perform tasks. Identifying available teleoperations systems may generally include, but is not limited to including, identifying whether a particular teleoperations system and/or teleoperator has other scheduled tasks, identifying skills possessed by a teleoperator, and/or any limitations associated with a particular teleoperations system. Identifying available human assistants may generally include, but is not limited to including, identifying how long it would take for a human assistant to reach a location associated with a customer and/or identifying skills possessed by a human assistant. In one embodiment, scheduling arrangement 304c may be arranged to accommodate specific requests from a customer, e.g., a specific request for a particular teleoperator or human assistant.

Data store arrangement 304d is configured to store data associated with an overall framework. By way of example, data store arrangement 304d may store information associated with customers, robotic assistants, human assistants, teleoperations systems, and/or teleoperators. The information stored may include, but is not limited to including, preferences of customers, schedules of teleoperators, schedules of human assistants, skills possessed by teleoperators, skills possessed by human assistants, capabilities of teleoperations systems, etc.

Optional data collection arrangement 304e and optional artificial intelligence engine 304f are arranged to enable management system 304 to collect data while a teleoperations system remotely operates a robotic assistant, and to use that data as training data to define and/or to improve artificial intelligence associated with autonomy systems. For example, data collected as a teleoperator operates a robotics arrangement may be collected by optional data collection arrangement 304e and provided as training data to optional artificial intelligence engine 304f. It should be appreciated that optional artificial intelligence engine 304f may create algorithms and processes which may facilitate the autonomous operation of robotic assistants. In one embodiment, the data collected by optional data collection arrangement 304e and processed by optional artificial intelligence engine 304f may be used to facilitate the autonomous operation of robotic assistants. In other words, the ability to collect information and to use the information to effectively train optional artificial intelligence engine 304f may enable robotic assistants to operate autonomously rather than under the control of a teleoperator, or to improve the autonomous operation of the robotic assistants.

Figure 4:
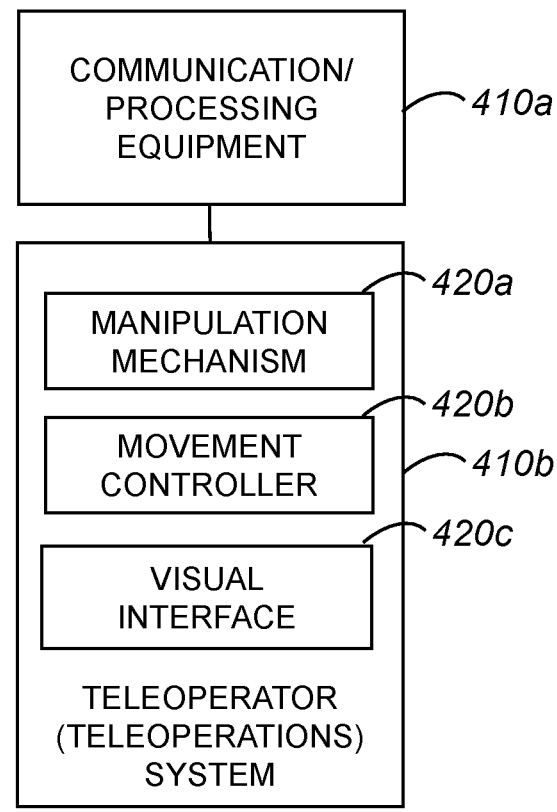
FIG. 4 is a block diagram representation of a teleoperations system in accordance with an embodiment.

FIG. 4 is a block diagram representation of a teleoperations operator arrangement in accordance with an embodiment. Teleoperations operator arrangement 408 may include communication/processing equipment 410a and teleoperator or human operator system 410b which are in communication with each other. Communication/processing equipment 410a may be arranged to receive or to otherwise obtain signals from a robotic assistant across a network. Signals may be processed by communications/processing equipment 410a to provide information that enables teleoperations operator arrangement 408 to operate the robotic assistant remotely. In one embodiment, information provided may include contextual information associated with a robotic assistant that teleoperations operator arrangement 408 may utilize when remotely controlling the robotic assistant. Communication/processing equipment 410a may also send or otherwise provide signals to the robotic assistant, as for example signals that include instructions to operate and/or to manipulate the robotic assistant.

Teleoperator or human operator system 410b generally includes controls and other equipment which enable a remote human to operate or to otherwise control a robotic assistant. Teleoperator or human operator system 410b may generally include a manipulation mechanism 420a such as a joystick, a steering wheel, a touchpad, and/or a keyboard. Teleoperator or human operator system 410b may also include a movement controller 420b and a visual interface 420c.

Movement controller 420b may include, but is not limited to including, pedals such as an accelerator pedal and a brake, a touchpad, and/or a keyboard. Visual interface 420c may, in one embodiment, include at least one display screen arranged to display images which substantially depict the environment around a robotic assistant that is controlled using teleoperations operator arrangement 408.

In one embodiment, teleoperator or human operator system 410b may be a virtual reality system which enables an operator to effectively place himself or herself in the environment of the robotics assistance. In such an embodiment, visual interface 420c may include a virtual reality headset.

Figure 5:
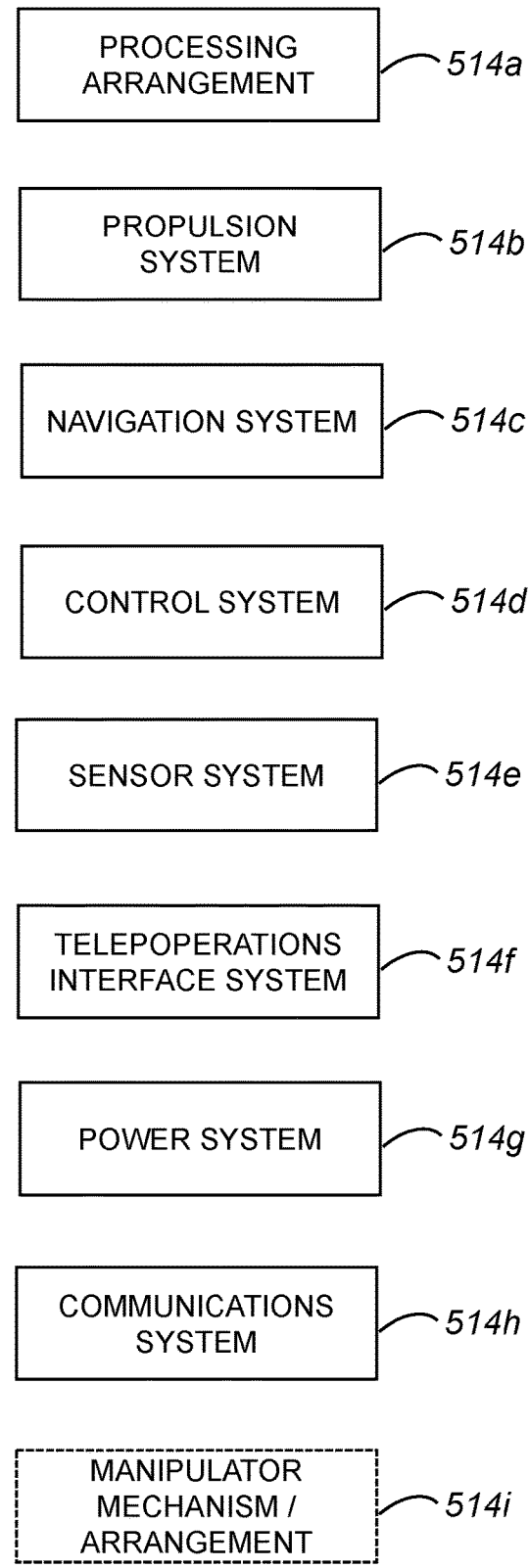
FIG. 5 is a block diagram representation of a robotic assistant in accordance with an embodiment.

FIG. 5 is a block diagram representation of a robotic assistant, e.g., a home robot such as a humanoid robot, in accordance with an embodiment. A robotic assistant 512 may be one of robotic assistants 112a-m of FIG. 1, robotic assistants 212a-m of FIG. 2, or robotic assistants 312a-m of FIG. 3. In one embodiment, robotic assistant 512 includes a processing arrangement or processor 514a, a propulsion system 514b, a navigation system 514c, a control system 514d, a sensor system 514e, a teleoperations interface control system 514f, a power system 514g, and a communications system 514h. It should be appreciated that processing arrangement 514a, propulsion system 514b, navigation system 514c, control system 514d, sensor system 514e, teleoperations interface control system 514f, power system 514g, and communications system 514h may be in communications with each other and physically coupled within robotic assistant 512.

Processing arrangement 514a is arranged to send instructions to and to receive instructions from or for various components such as propulsion system 514b, navigation system 514c, control system 514d, sensor system 514e, power system 514g, and communications system 514h. Propulsion system 514b, or a conveyance system, is arranged to cause robotic assistant 512 to move, e.g., propel or travel. By way of example, propulsion system 514b may include steering and braking systems, as well as an engine which may enable robotic assistant 512 to travel to complete a task or a mission. In general, propulsion system 514b may be configured as a drive system with a propulsion engine and mechanisms such as wheels or moveable appendages which enable movement. A propulsion engine may be an electric motor, though the propulsion engine is not limited to being an electric motor.

In one embodiment, navigation system 514c may control propulsion system 514b to navigate robotic assistant through an environment, e.g., a home environment. That is, navigation system 514c may enable robotic assistant 512 to operate in an autonomous manner. Navigation system 514c may include at least one of digital maps, photographs, and a global positioning system (GPS). Maps, for example, may be utilized in cooperation with sensors included in sensor system 514e to allow navigation system 514c to cause robotic assistant 512 to navigate through an environment. It should be appreciated that in some instances, robotic assistant 512 may be configured to operate substantially under the control of a teleoperations system or a remote control, and may not operate autonomously. For example, for tasks that robotic assistant 512 is unable to perform autonomously, robotic assistant 512 may operate under the control of a teleoperations system or a remote control.

Sensor system 514e includes any suitable sensors which facilitate the operation of robotic assistant 512, as for example LiDAR, radar, ultrasonic sensors, microphones, altimeters, and/or cameras. Sensor system 514e generally includes onboard sensors which allow robotic assistant 512 to safely navigate, and to ascertain when there are objects near robotic assistant 512, and/or to provide data which enables robotic assistant 512 to operate under the control of a teleoperations system or a remote control. Data collected by sensor system 514e may be used by a perception system associated with navigation system 514c to determine or to otherwise understand an environment around robotic assistant 512. Data collected by sensor system 514 may also include image data, e.g., data collected by one or more cameras, of an environment around robotic assistant 512.

Power system 514g is arranged to provide power to robotic assistant 512. Power may be provided as electrical power, gas power, or any other suitable power, e.g., solar power or battery power. In one embodiment, power system 514g may include a main power source, and an auxiliary power source that may serve to power various components of robotic assistant 512 and/or to generally provide power to autonomous vehicle 512 when the main power source does not have the capacity to provide sufficient power.

Teleoperations interface control system 514f generally enables robotic assistant 512 to be controlled remotely, as for example by a teleoperations operator arrangement. That is, teleoperations interface control system 514f enables robotic assistant 512 to operate by obtaining and processing instructions provided by a teleoperations operator arrangement. Additionally, teleoperations interface control system 514f may enable robotic assistant 512 to determine when robotic assistant 512, while operating autonomously, may benefit from being controlled via teleoperations.

Communications system 514h allows robotic assistant 512 to communicate, as for example, wirelessly, with a management system (not shown) that allows robotic assistant 512 to be controlled remotely. Communications system 514j generally obtains or receives data, stores the data, and transmits or provides the data to a fleet management system.

In one embodiment, robotic assistant 512 includes an optional manipulator mechanism or arrangement 514i. Manipulator arrangement 514i may configured to enable robotic assistant 512 to perform a task. By way of example, manipulator arrangement 514i may be configured as one or more robotic arms or appendages which may grasp and manipulate an object. An object may be held by manipulator arrangement 514i while robotic assistant 512 is propelled by propulsion system 514b. Optional manipulator mechanism or arrangement 514i may also be configured as a vacuum, a floor sweeper, and/or a mop. A teleoperator may control manipulator arrangement 514i via teleoperations interface system 514f.

Figure 6:
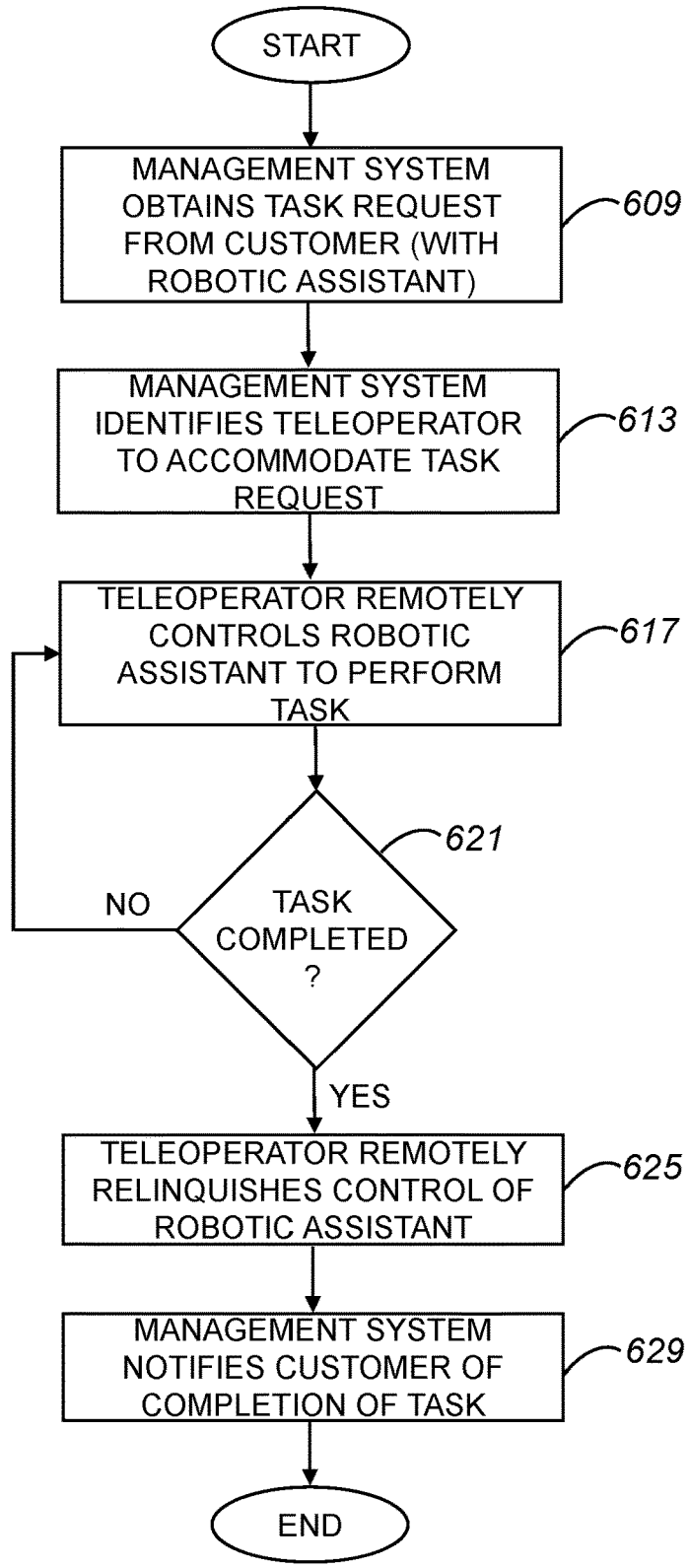
FIG. 6 is a process flow diagram which illustrates a method of operating a robotic assistant using teleoperations in accordance with an embodiment.

FIG. 6 is a process flow diagram which illustrates a method of operating a robotic assistant using teleoperations in accordance with an embodiment. A method 605 of operating a robotic assistant that is part of a framework, e.g., framework 100 of FIG. 1, begins at a step 609 in which a management system of the framework obtains a task request from a customer that owns or possesses a robotic assistant that is part of the framework.

Once the management system obtains a task request, the management system identifies a teleoperator that is suitable for accommodating the request in a step 613. A suitable teleoperator may be an available teleoperator and/or a teleoperator who has particular skills that may enable the teleoperator to successfully complete the requested task. The suitable teleoperator may be located at a location at which multiple teleoperators are situated, e.g., a corporate environment which has multiple teleoperations system which may be operated by teleoperators, or the suitable teleoperator may be located at a substantially private location with a teleoperations system, e.g., a home or a residence.

After the teleoperator is identified, the teleoperator may use a teleoperations system to control the robotic assistant to perform the task in a step 617. In a step 621, it is determined whether the task is complete. If the determination is that the task is not yet complete, process flow returns to step 617 in which the teleoperator continues to remotely control the robotic assistant.

Alternatively, if it is determined in step 621 that the task has been completed, the teleoperator remotely relinquishes control of the robotic assistant in a step 625. Relinquishing control may include, but is not limited to including, placing the robotic assistant into a state in which the robotic assistant is effectively parked and not performing any active task. Parking the robotic assistant may involve situating the robotic assistant at a charging station or a charging dock. Once the teleoperator relinquishes control of the robotic assistant, the management system notifies the customer that the task has been completed in a step 629, and the method of performing a task is completed.

Figure 7A:
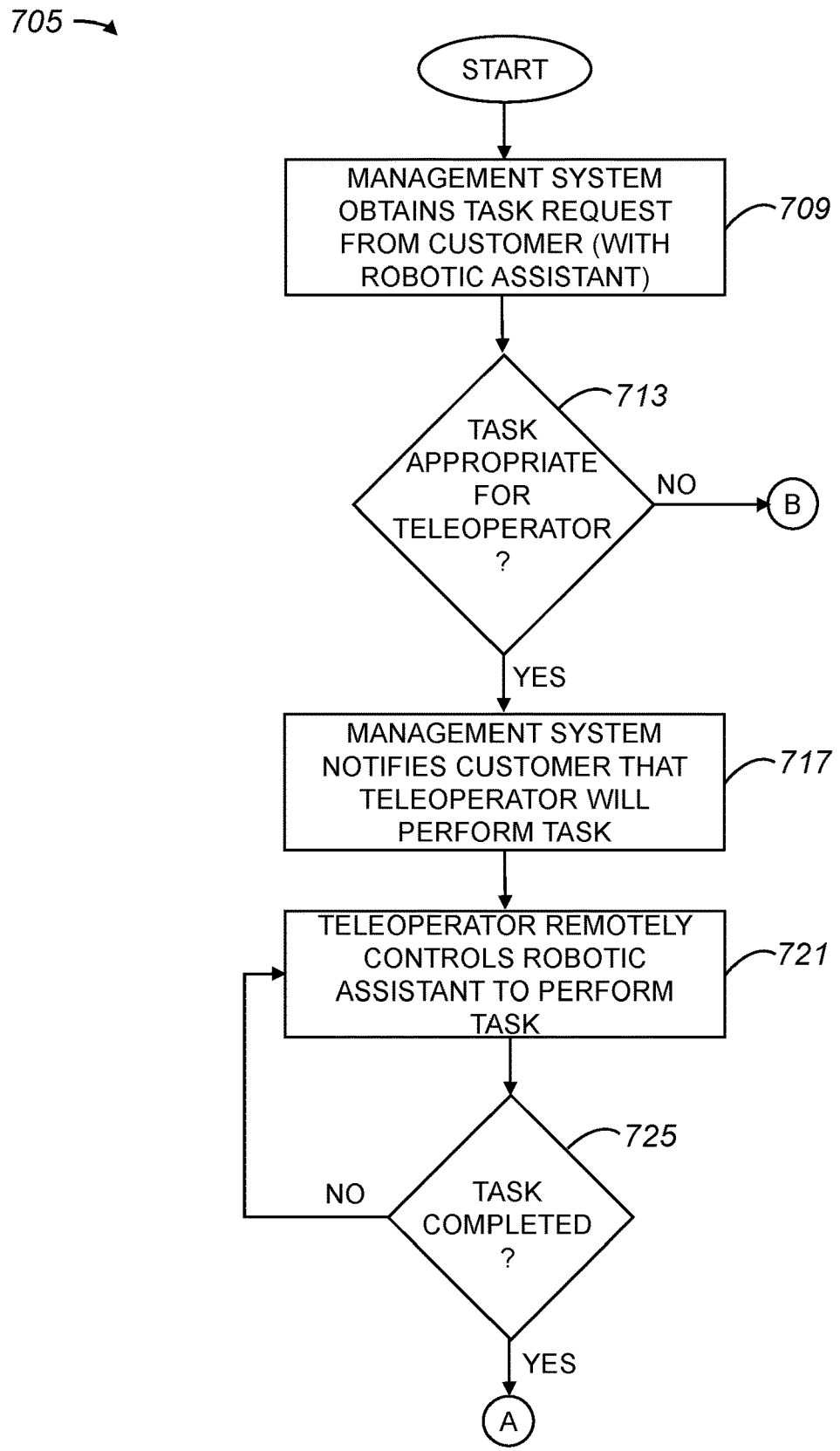
FIGS. 7A-C are a process flow diagram which illustrates a method of performing a task within a framework which includes robotic assistants and human assistants in accordance with an embodiment.
Figure 7B:
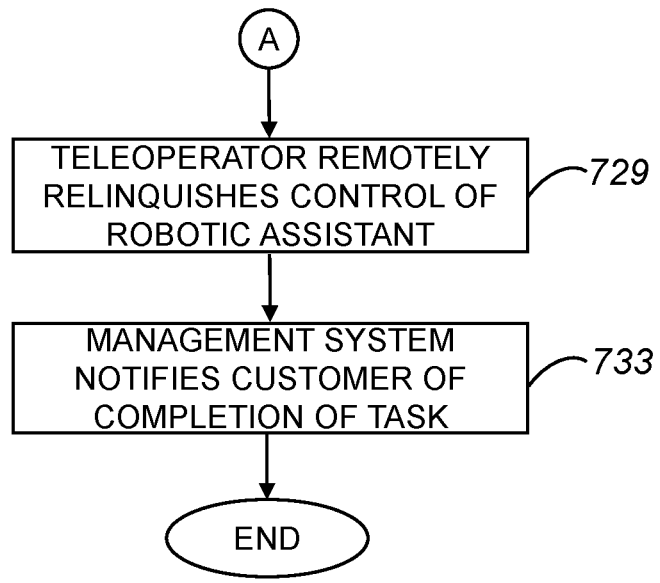
Figure 7C:
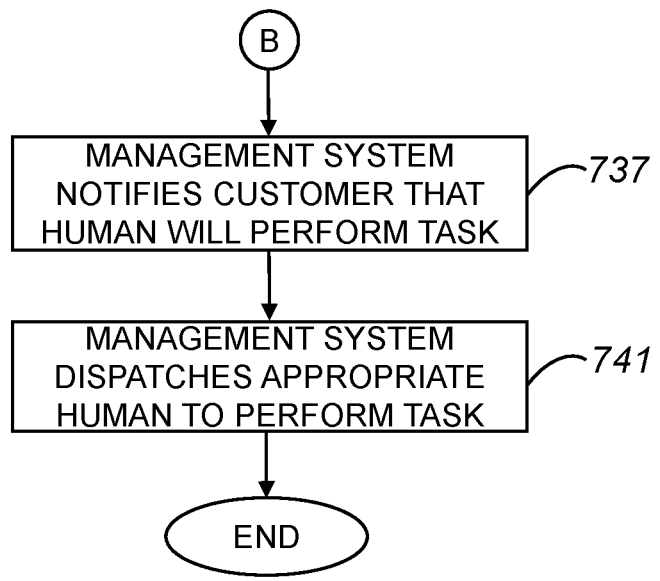

As mentioned above, a framework may include both robotic assistants and human assistants. The selection of whether a robotic assistant or a human assistant is suitable to complete a requested task may depend on preferences of a customer and/or the requirements of the requested task. With reference to FIGS. 7A-C, a method of performing a task within a framework which includes robotic assistants and human assistants will be described in accordance with an embodiment. A method 705 of performing a task begins at a step 709 in which a management system of a framework that includes robotic assistants and human assistants, e.g., management system 304 of FIG. 2, in which a management system obtains a task request from a customer. The customer is generally an owner of, and/or in possession of, a robotic assistant.

A determination is made in a step 713 as to whether the task that is the subject of the task request is appropriate for servicing or otherwise handling by a teleoperator. That is, it is determined whether the robotic assistant may perform the task in cooperation with a teleoperator, or whether a human assistant is more appropriate for performing the task.

If the determination in step 713 is that the task is appropriate for servicing by a teleoperator, the management system notifies the customer in a step 717 that a teleoperator will perform the requested task using a teleoperations system to control the robotic assistant. Then, in a step 721, the teleoperator remotely controls the robotic assistant to perform the requested task.

Once the teleoperator remotely controls the robotic assistant, it is determined in a step 725 whether the task has been completed. If the determination is that the task has not been completed, process flow returns to step 721 in which the teleoperator continues to remotely control the robotic assistant in order to perform the task.

Alternatively, if it is determined in step 725 that the task has been completed, then in a step 729, the teleoperator remotely relinquishes control of the robotic assistant. By way of example, the teleoperator may cause the robotic assistant to move to a default location and then effectively park the robotic assistant. After the teleoperator remotely relinquishes control of the robotic assistant, the management system notifies the customer that the requested task has been completed, and the method of performing a task is completed.

Returning to step 713 and the determination of whether a task is appropriate for servicing by a teleoperator, if it is determined that the task is better suited for operation by a human assistant than by a robotic assistant, process flow proceeds to a step 737 in which the management system notifies the customer that the requested task will be performed by a human assistant rather than by a robotic assistant. Once the customer is notified, the management system dispatches an appropriate human assistant to perform the requested task in a step 741, and the method of performing a task is completed.

Figure 8:
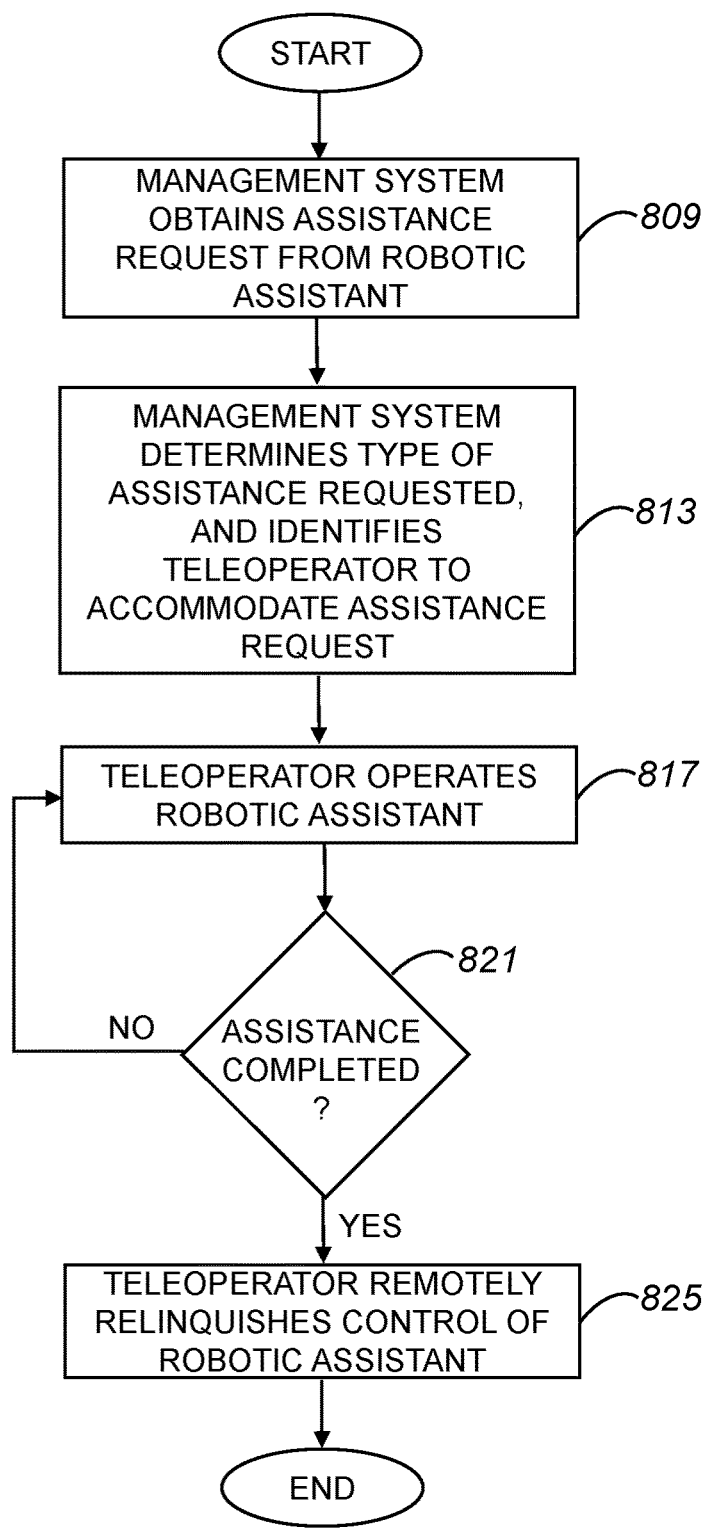
FIG. 8 is a process flow diagram which illustrates a method of providing an autonomous robotic assistant with teleoperations assistance in accordance with an embodiment.

In one embodiment, a robotic assistant that is part of a framework as described above with respect to FIGS. 1 and 2 may be configured to operate autonomously. While operating autonomously, a robotic assistant may encounter a situation for human intervention, as for example by a teleoperator, may be desired. For example, a robotic assistant may be unable to address a particular issue, and may request assistance from a teleoperator. FIG. 8 is a process flow diagram which illustrates a method of providing an autonomous robotic assistant with teleoperations assistance upon request in accordance with an embodiment. A method 805 of providing teleoperations assistance upon request begins at a step 809 in which a management system of a framework, as for example management system 104 of FIG. 1 or management system 204 of FIG. 2, obtains a request for assistance from a robotic assistant.

Upon obtaining the request for assistance, the management system may determine or otherwise identify a type of assistance requested, and may identify a particular teleoperator and/or teleoperations system to accommodate the request for assistance in a step 813. The type of assistance requested may vary widely and may include, but is not limited to including, assistance with completing a task, assistance with identifying an obstacle, and/or assistance with diagnosing an issued identified by the robotic assistant.

In a step 817, a teleoperator essentially takes control of the robotic assistant and operates the robotic assistant remotely using a teleoperations system. It should be appreciated that the teleoperator takes control of the robotic assistant when the management system provides the teleoperations system with the ability to operate the robotic assistant. After the teleoperator takes control of the robotic assistant, a determination is made in a step 821 as to whether the robotic assistant has successfully responded to the request for assistance. That is, it is determined whether a task specified in the request for assistance has been completed.

If it is determined in step 821 that assistance has not been completed, the teleoperator continues to operate the robotics assistance remotely using the teleoperations system in step 817. Alternatively, if it is determined that assistance is completed, process flow proceeds to a step 825 in which the teleoperator remotely relinquishes control of the robotic assistant. In one embodiment, relinquishing control of the robotic assistant includes essentially notifying the robotic assistant to resume autonomous operation. After the teleoperator relinquishes control of the robotics assistance, the method of providing teleoperations assistance is completed.

In one embodiment, a framework may enable an owner or possessor of a robotic assistant to define parameters, or to otherwise provide instructions, associated with the deployment of the robotic assistant within an environment. By way of example, an owner may wish to essentially limit areas in which a teleoperator may remotely operate a robotic assistant, or the owner may wish to prevent a teleoperator from effectively seeing certain features within the areas. That is, privacy-related parameters or instructions may be specified by an owner of a robotic assistant. By specifying privacy-related parameters, an owner may essentially prevent a teleoperator from being able to view sensitive areas or sensitive items while remotely operating a robotic assistant in premises associated with the owner, e.g., a home or residence of the owner.

Figure 9:
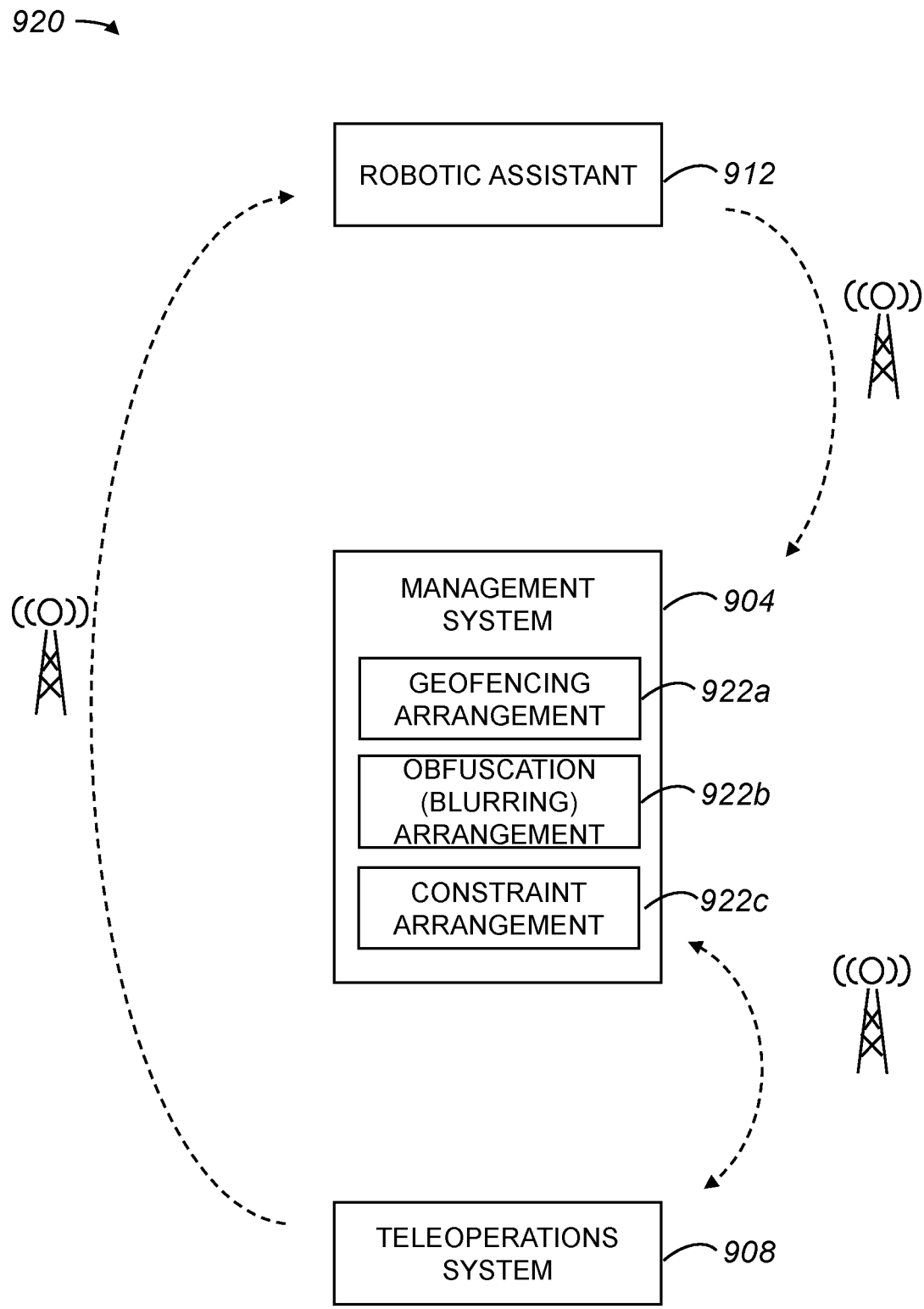
FIG. 9 is a diagrammatic representation of a framework which addresses privacy, security, and safety issues associated with operating a robotic assistant using a teleoperations system in accordance with an embodiment.

FIG. 9 is a diagrammatic representation of a framework which addresses privacy, security, and safety issues associated with operating a robotic assistant using a teleoperations system in accordance with an embodiment. A framework 920 may include a management system 904, at least one teleoperations system 908, and at least one robotic assistant 912 which may communicate with management system 904 and teleoperations system 908 using wireless and/or wired communications.

Robotic assistant 912 is generally owned by or possessed by an individual or organization, and may be deployed in an environment such as a home, a warehouse, and/or any other building such as a hospital building. Teleoperations system 908 may be assigned to remotely operate robotic assistant 912. In one embodiment, when an owner requests remote operation of robotic assistant 912 to perform a task, the owner may contact management system 904 which may then identify teleoperations system 908 as being suitable for taking control of robotic assistant 912 to perform the task.

Parameters that are specified or set by an owner of robotic assistant 912 may be provided to management system 904 such that teleoperations system 908 may be used to remotely operate robotic assistant 912 in a manner that is desired by the owner, e.g., a manner that is consistent with the parameters. Management system 904, which generally includes components described above with respect to management system 304 of FIG. 3, includes a geofencing arrangement 922a, an obfuscation or blurring arrangement 922b, and a constraint arrangement 922c.

Geofencing arrangement 922a is configured to utilize location information provided by an owner of robotic assistant 912 to define one or more areas within which robotic assistant 912 is allowed to travel while under the control of teleoperations system 908. In other words, geofencing arrangement 922a is configured to use parameters provided by an owner of robotic assistant 912 to effectively geofence an area within which robotic assistant 912 may be operated by teleoperations system 908. In one embodiment, geofencing arrangement 922a may cooperate with sensors located in the areas within which robotic assistant 912 is allowed to travel to effectively define the areas, or the boundaries within which robotic assistant 912 may operate.

Obfuscation or blurring arrangement 922b is configured to utilize information provided by an owner of robotic assistant 912 that relates to what teleoperations system 908 is substantially authorized to display to a teleoperator. By way of example, an owner may indicate that views into an area other than a geofenced area are to be blurred or otherwise obscured from view, that the faces of any people within the geofenced area, and/or that any confidential information such as credit card bills are obfuscated or blurred. Obfuscation or blurring arrangement 922b may generally protect the privacy of an owner of robotic assistant 912 by substantially limiting what an operator using teleoperations system 908 may view.

Constraint arrangement 922c is configured to utilize information provided by an owner of robotic assistant 912 to effectively set constraints associated with the remote operation or robotic assistant 912 using teleoperations system 908. Constraints may include, but are not limited to including, specifying tasks that robotic assistant 912 may perform, specifying how robotic assistant 912 is expected to respond to certain situations, and/or specifying a length of time robotic assistant 912 is to be remotely controlled. By way of example, constraints may indicate that robotic assistant 912 is not allowed to pick up particular items when there are people within a line-of-sight or robotic assistant 912, and/or that robotic assistant 912 is to notify an owner when a particular situation arises.

Figure 10A:
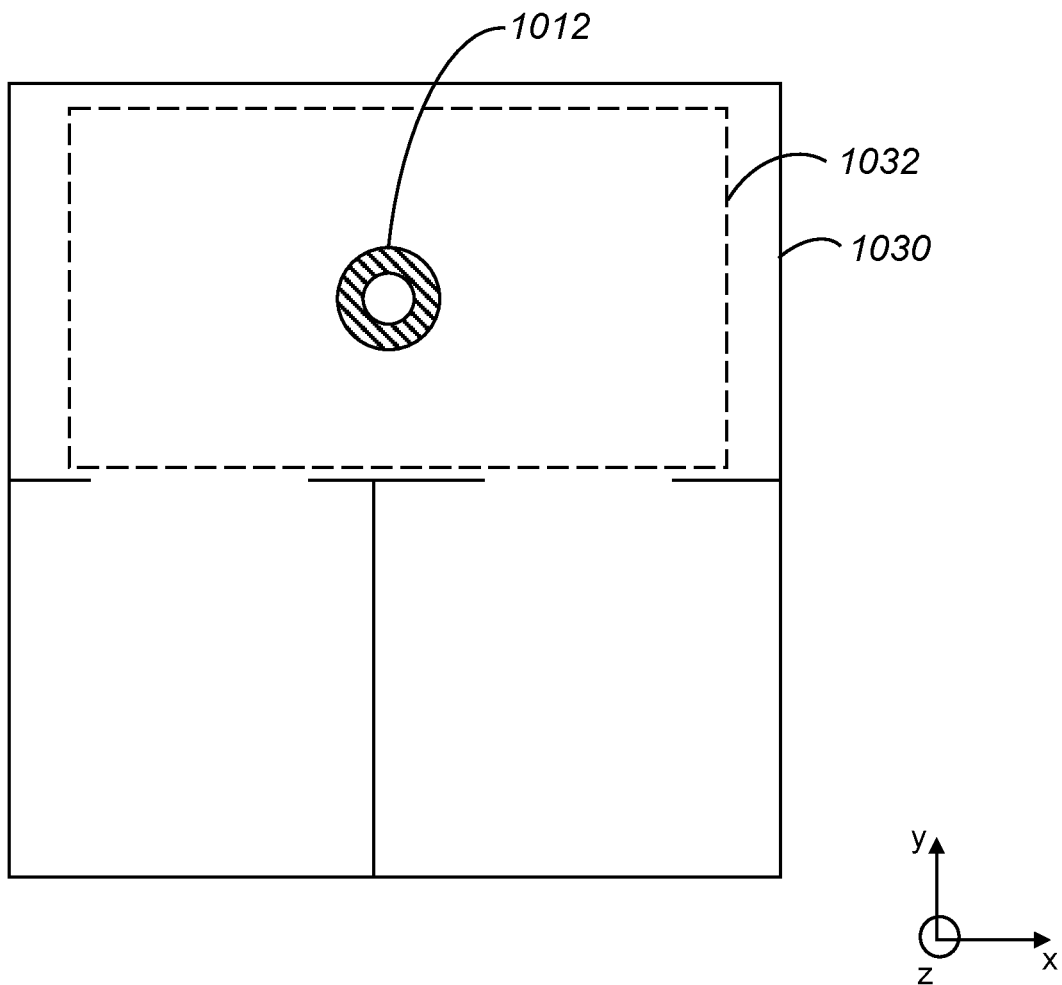
FIG. 10A is diagrammatic representation of an environment in which geofencing is utilized to constrain an area within which a teleoperator may monitor or operate a robotic assistant in accordance with an embodiment.

Due to privacy and/or security concerns, as well as safety concerns, boundaries within which a remotely controlled robotic assistant may operate may be defined by an owner of the robotic assistant. For example, an owner of a robotic assistant deployed in a home may not want a teleoperator to be able to operate the robotic assistant in particular rooms of the house. As such, the owner may effectively geofence the robotic assistant within a defined zone. A zone may be defined by specifying constraints which may then be processed by a management system of an overall framework such as management system 904 of FIG. 9. Alternatively, a zone may be defined using sensors which cooperate with sensors on a robotic assistant to substantially cause the robotic assistant to remain within the zone. FIG. 10A is diagrammatic representation of an environment in which geofencing is utilized to constrain an area within which a teleoperator may monitor or operate a robotic assistant in accordance with an embodiment. A robotic assistant 1012 may be remotely operated within an environment 1030 by a teleoperator using a teleoperations system (not shown). Environment 1030 may be any suitable environment including, but not limited to including, a building such as a house or a warehouse, and/or an outdoor space such as a yard or a parking lot.

An area 1032 within which robotic assistant 1012 may be remotely operated may be defined within environment 1030. That is, robotic assistant 1012 may be geofenced within boundaries of area 1032. For example, when environment is a house 1032, area 1032 may be defined as one or more rooms that robotic assistant 1012 is allowed to enter when under the control of a teleoperator. Sensors may be used, in one embodiment, to prevent robotic assistant 1012 from moving outside of area 1032.

In addition to, or in lieu of, constraining robotic assistant 1012 to operating within area 1032 when under the control of a teleoperator, additional measures may be taken to substantially ensure that privacy, security, and/or safety concerns of an owner of robotic assistant 1012 may be accounted for. One additional measure, as mentioned above, involves blurring or otherwise obfuscating certain areas, objects, and/or people when images are rendered on a display screen of a teleoperations system. For example, when images are rendered on a visual interface or a display screen of a teleoperations system, certain areas, objects, and/or people may be blurred in the displayed rendering.

Figure 10B:
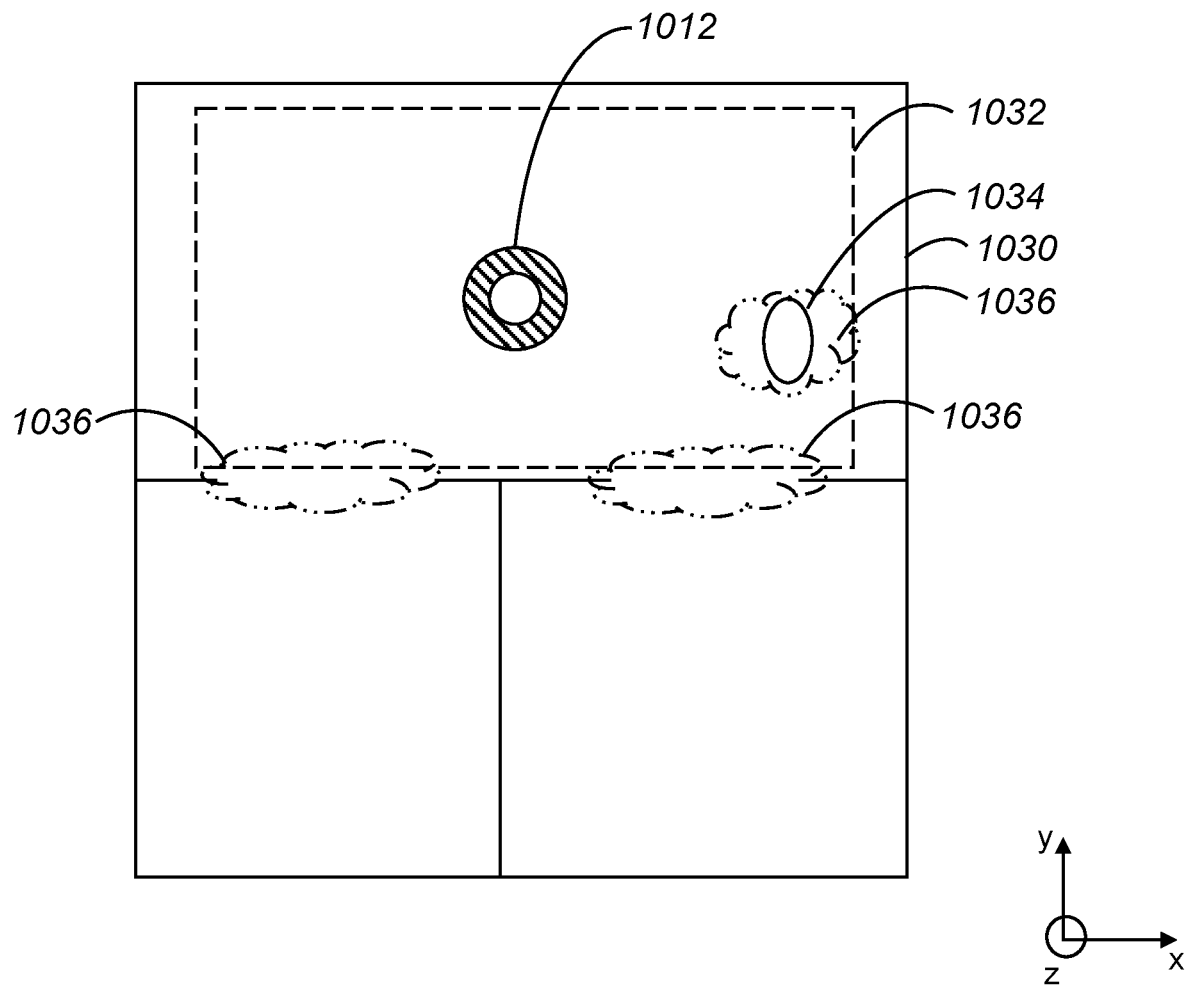
FIG. 10B is diagrammatic representation of an environment in which geofencing is utilized to constrain an area within which a teleoperator may monitor or operate a robotic assistant, e.g., robotic assistant 1012 of FIG. 10A, and blurring or obfuscation is used to prevent the teleoperator from seeing particular details associated with the environment in accordance with an embodiment.

As shown in FIG. 10B, blurred portions 1036 may obscure areas, objects, and/or people that are not to be viewed in detail on a teleoperations system. In general, blurring may be applied to effectively hide areas, objects, and/or people from a view that is provided to a teleoperations system. That is, when a sensor on robotic assistant 1012 captures an image of an area, object, and/or person that is to be obscured, a rendering of the image may be blurred or otherwise prevented from being shown in detail. By way of example, when robotic assistant 1012 captures an image of an object or individual 1034, a rendering of object or individual 1034 may be blurred when displayed using a teleoperations system. Similarly, areas outside of area 1032 may be blurred when robotic assistant 1012 captures an image of the areas outside of area 1032.

Instead of blurring object or individual 1034, object or individual 1034 may effectively be replaced with other objects or icons when presented to a teleoperations system. By way of example, if object 1034 is a piece of paper on which confidential information is printed, the confidential information may be blurred, or object 1034 may be replaced or covered by an object such as a blank piece of paper when presented to a teleoperations system. By replacing object or individual 1034, rather than blurring object or individual 1034, a teleoperator operations assistant may be provided with information relating to the size of object or individual 1034, and may navigate robotic assistant 1012 around object or individual 1034 as needed.

In one embodiment, data may be collected while a teleoperator operates a robotic assistant. That is data gathered from sensors while a teleoperator completes a task by remotely operating and/or manipulating a robotic assistant may be collected within a framework, as for example by a management system within the framework. The collected data may be used to effectively train an artificial intelligence engine such that a robust autonomy system arranged to enable robotic assistants to operate autonomously may be created. That is, data collected while a robotic assistant operates under the control of a teleoperator may be used to facilitate the autonomous operation of the robotic assistant and/or other robotic assistants by training the artificial intelligence engine. The data collected while the robotic assistant operations under the control of a teleoperator may identify situations and how situations are navigated. Hence, using the data to train an artificial intelligence engine associated with an autonomy system of the robotic assistant improves the ability of the autonomy system to navigate the situations.

Figure 11:
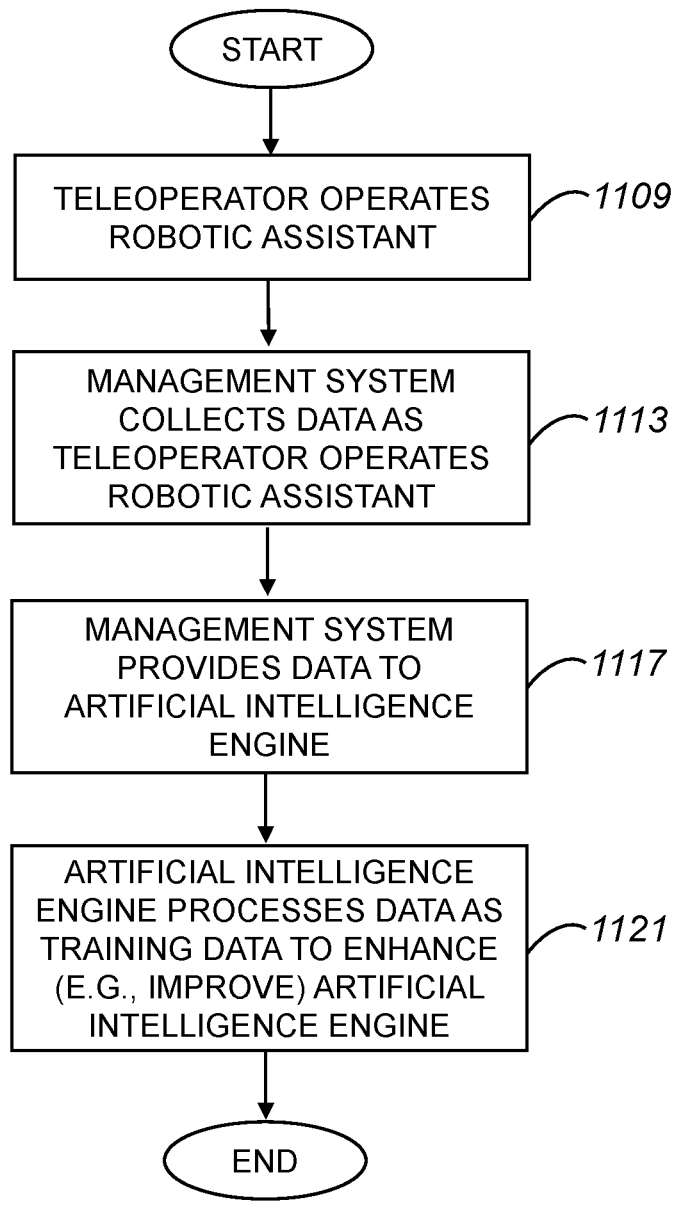
FIG. 11 is a process flow diagram which illustrates a method of obtaining and utilizing data to effectively train an autonomy system in accordance with an embodiment.

FIG. 11 is a process flow diagram which illustrates a method of obtaining and utilizing data collected while a robotic assistant is operating remotely such that the data may be used to train an autonomy system in accordance with an embodiment. A method 1105 of obtaining and utilizing data collected from a teleoperated robotic assistant begins at a step 1109 In which a teleoperator operates a robotic assistant, e.g., using a teleoperations system such as teleoperations system 408 of FIG. 4.

As the teleoperations system is used to operate the robotic assistant, data may be collected in a step 1113. Data may be collected from various sensors on the robotic assistant, as well as from information such as contextual information that may be provided by a teleoperator. In one embodiment, the data is collected by the teleoperations system and provided to a management system such as management system 304 of FIG. 3.

In a step 1117, the management system provides the data to an artificial intelligence engine. The artificial intelligence engine may then process the data as training data in a step 1121. That is, the artificial intelligence engine may build and/or refine models using the data. The models may be enhanced, e.g., improved, using the data captured while the robotic assistant is teleoperated such that the autonomous operation of the robotic assistant may be improved in the future. The method of obtaining and utilizing data collected from a teleoperated robotic assistant is completed once the data is processed as training data.

Figure 12:
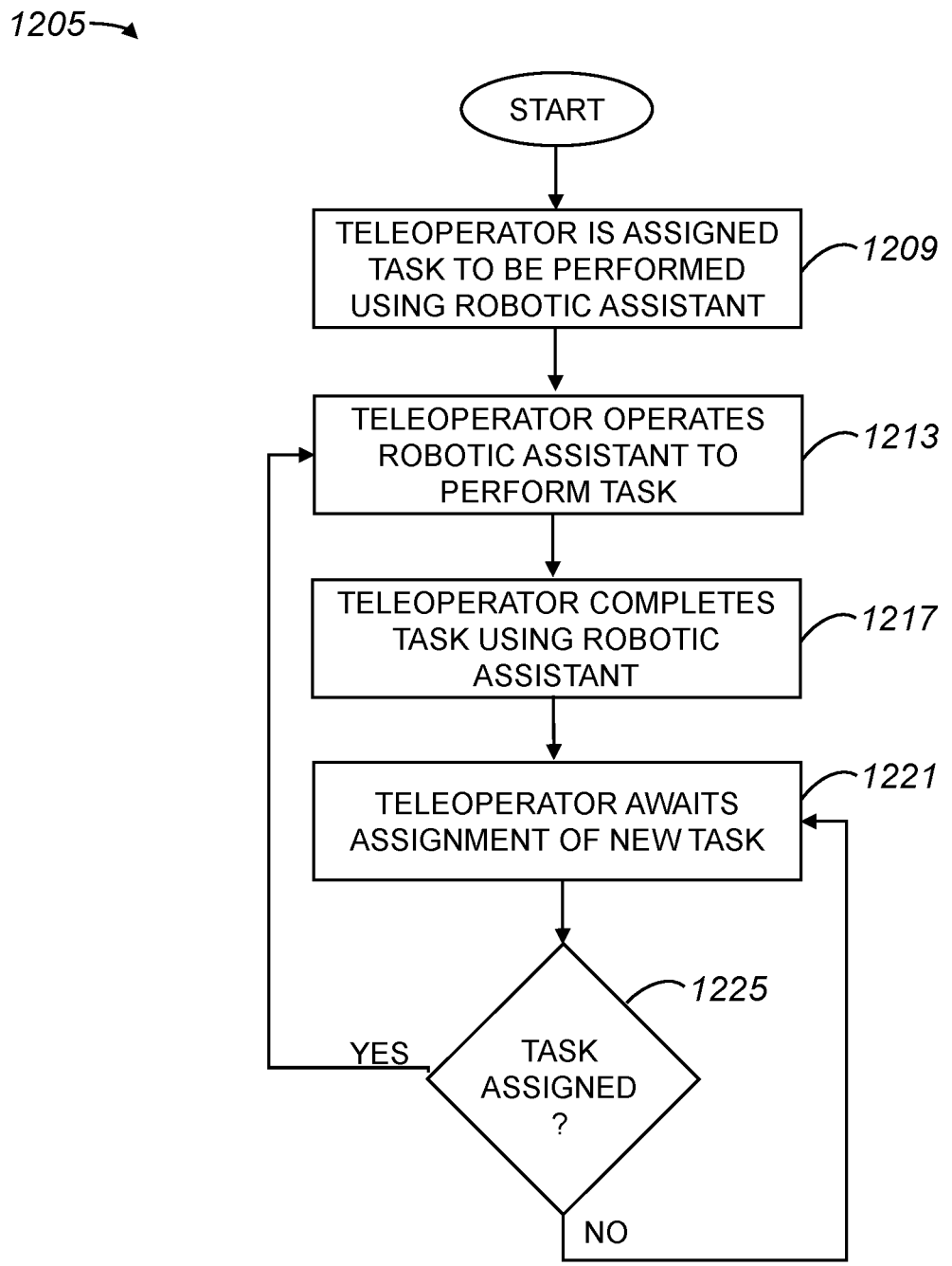
FIG. 12 is a process flow diagram which illustrates a method of servicing tasks from the point-of-view of a teleoperator in accordance with an embodiment.

A framework which facilitates the remote operation of a robotic assistant by a teleoperator allows the teleoperator to efficiently schedule tasks. A teleoperator may perform tasks associated with robotic assistants at different or distinct locations substantially back-to-back, as the teleoperator does not have to physically travel to different locations in order to operate the robotic assistants. Additionally, a management system may efficiently schedule tasks without accounting for tasks being associated with different locations, e.g., locations that are geographically far apart. FIG. 12 is a process flow diagram which illustrates a method of servicing tasks using a robotic assistant from the point-of-view of a teleoperator in accordance with an embodiment. A method 1205 of servicing tasks begins at a step 1209 in which a teleoperator is assigned a task that is to be performed using a robotic assistant. The task may be assigned by a management system when an owner of the robotic assistant makes a request or when a robotic assistant operating autonomously requests assistance.

Once the teleoperator is assigned the task, the teleoperator remotely operates the robotic assistant using a teleoperations system in a step 1213 to perform the task. In a step 1217, the teleoperator completes the task using the robotic assistant. Completing the task may include, but is not limited to including, the teleoperator relinquishing control of the robotic assistant after substantially ensuring that the robotic assistant is in a safe configuration and/or location.

After the task is completed, the teleoperator may await the assignment of a new task in a step 1221. A determination is made in a step 1225 as to whether a new task has been assigned to the teleoperator by a management system. If the determination is that a task has not been assigned, process flow returns to step 1221 in which the teleoperator awaits the assignment of a new task. Alternatively, if the determination is that a task has been assigned, process flow returns to step 1213 in which the teleoperator operates a robotic assistant to perform the task.

Figure 13:
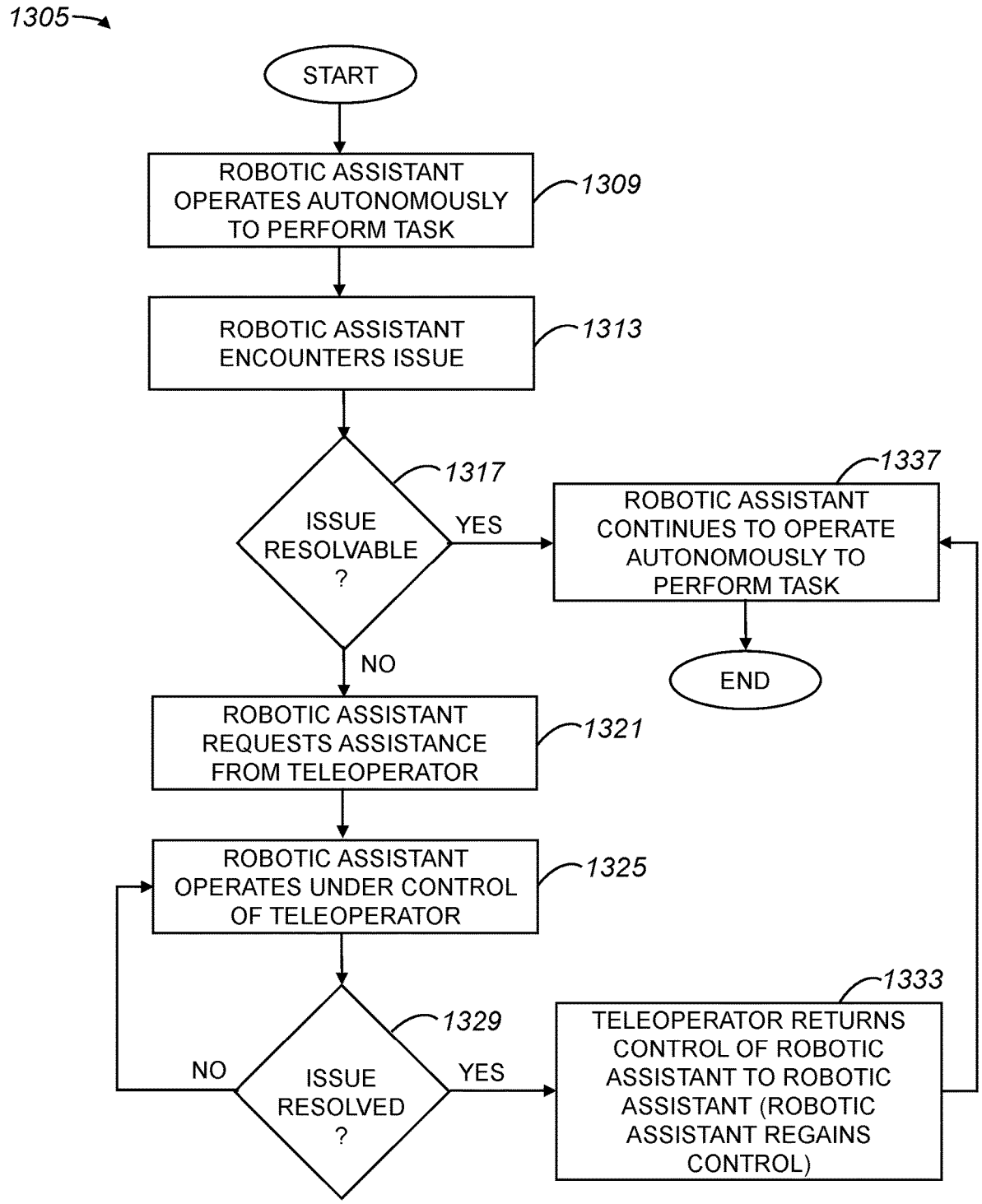
FIG. 13 is a process flow diagram which illustrates a method of an autonomously operating robotic assistant addressing an issue in accordance with an embodiment.

As discussed above with reference to FIG. 8, a robotic assistant that is operating autonomously to complete a tasks may request assistance from a teleoperator. Assistance may generally be requested when the robotic assistant encounters an issue. The issue may be a situation that the robotic assistant is unfamiliar with, or a situation that the robotic assistant determines would be better handled by a teleoperator. With reference to FIG. 13, a method of an autonomously operating robotic assistant addressing an issue encountered by the robotic assistant will be described in accordance with an embodiment. A method 1305 of an autonomously operating robotic assistant addressing an issue begins at a step 1309 in which the robotic assistant operates autonomously to perform a task. The task is typically a task requested by an owner of the robotic assistant.

While operating autonomously to perform the task, the robotic assistant encounters an issue in a step 1313. The issue may generally be a situation encountered by the autonomously operating robotic assistant that the robotic assistant determines may benefit from intervention by a teleoperator. For example, the robotic assistant may encounter an obstacle that may prevent the robotic assistant from completing the task.

Once the robotic assistant encounters the issue, it is determined in a step 1317 whether the issue is resolvable. In other words, the robotic assistant determines whether the robotic assistant may resolve the issue while operating autonomously, e.g., by finding a workaround and/or by waiting form the issue to resolve itself.

If the determination in step 1317 is that the issue is resolvable, the indication is that intervention by a teleoperator is not needed. As such, process flow proceeds to a step 1337 in which the robotic assistant continues to operate autonomously to perform the task, and the method of an autonomously operating robotic assistant addressing an issue is completed.

Alternatively, if it is determined in step 1317 that the issue may not be resolvable by the autonomously operating robotic assistant, the robotic assistant requests assistance from a teleoperator in a step 1321. It should be appreciated that the robotic assistant may make a request for assistance from a teleoperator to a management system, and that the management system may effectively assign a teleoperator to take control of the robotic assistant.

In a step 1325, the robotic assistant is assigned a teleoperator, and operates under the control of a teleoperator. A determination is made in a step 1329 as to whether the issue encountered by the robotic assistant is resolved. If the determination is that the issue has not been resolved, process flow returns to step 1325 in which the robotic assistant continues to operate under the control of the teleoperator. Alternatively, if it is determined that the issue is resolved, then in a step 1333, the robotic assistant regains control from the teleoperator. Upon the teleoperator returning control of the robotic assistant to the robotic assistant, process flow moves to step 1337 in which the robotic assistant operates autonomously to perform the task.

As discussed above, when a teleoperator remotely controls a robotic assistant that is located at a premises of an owner of the robotic assistant, measures may be taken to protect the privacy of the owner. For example, sensitive areas and/or objects may be obfuscated such that a teleoperator is unable to view areas and/or objects that an owner does not wish for the teleoperator to see. To further protect the privacy of an owner, the owner may be presented with video which effectively shows the owner what a teleoperator sees while the teleoperator remotely operates a robotic assistant at a premises of the owner. Such a video may be provided in real time as the robotic assistant is operated by a teleoperator, or such a video may be provided after the robotic assistant is operated by the teleoperator. That is, video may be provided to the owner of a robotics video as a live feed while a robotic assistant is teleoperated to perform a task, or as archival video substantially after the robotic assistant has performed the task.

Figure 14:
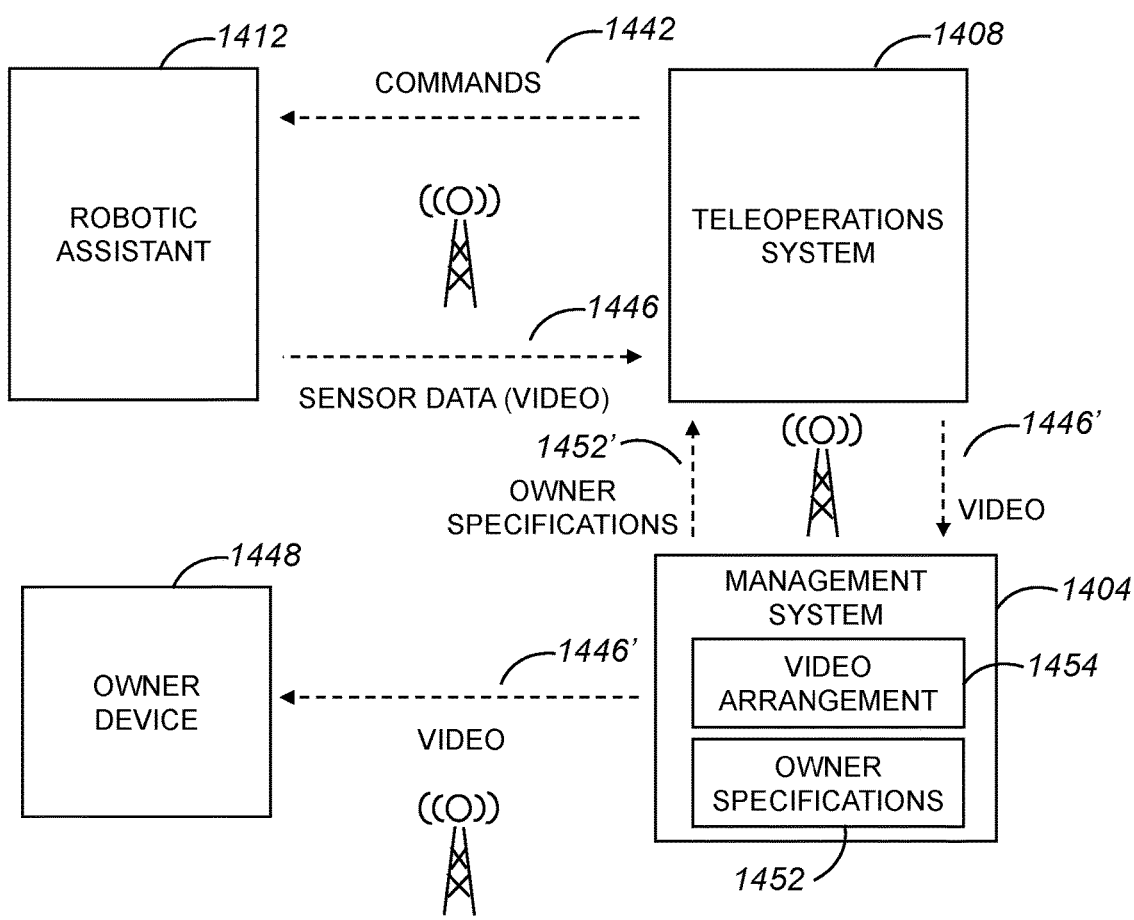
FIG. 14 is a block diagram representation of a framework which enables a customer to obtain video relating to the operation of a robotic assistant in accordance with an embodiment.

FIG. 14 is a block diagram representation of a framework which enables a customer to obtain video relating to the operation of a robotic assistant in accordance with an embodiment. A framework 1440 includes a management system 1404, a teleoperations system 1408, a robotic assistant 1412 owned by an owner, and an owner device 1448 which is in the possession of the owner.

Management system 1404 is arranged to store specifications 1452 provided by an owner of robotic assistant 1412. Specifications 1452 may include, but are not limited to including, configuration information such as privacy instructions and/or video preferences. Management system 1404 also include a video arrangement 1454 configured to process video 1446', store video 1446', and provide video 1446' to owner device 1448.

When management system 1404 assigns teleoperations system 1408 to remotely operate robotic assistant 1412, management system 1404 provides information associated with owner specifications 1452' to teleoperations system 1408 on a network. That is, management system 1404 effectively implements owner specifications 1452', which includes privacy-related specifications, with respect to teleoperations system 1408. Teleoperations system 1408 issues commands 1442 to robotic assistant 1412 over a network to manipulate robotic assistant 1412. Robotic assistant 1412 provides sensor data 1446 to teleoperations system 1408 over a network to enable teleoperations system 1408 to determine how to manipulate robotic assistant 1412 to complete a task. Sensor data 1446 generally includes data from one or more cameras, e.g., video data, which is rendered on a display screen (not shown) of teleoperations system 1408. Information associated with owner specifications 1452' may indicate portions of video data 1446 to obfuscate such that an operator of teleoperations system 1408 is unable to view those portions.

Teleoperations system 1408 may provide video 1446' to management system 1404. Video arrangement 1454 of management system 1404 may provide video 1446' across a network to owner device 1448 in accordance with owner specifications 1452. For example, video 1446' may be provided to owner device 1448 as a live feed or as a video recording.

Owner device 1448 may be any device which may communicate with management system 1404 on a network, and may obtain or otherwise receive video 1446' from management system 1404. Owner device 1448 may be, for example, a computing system or a smartphone. Video 1446' may be obtained by owner device 1448 through an application, in a text message, and/or in an email message. It should be appreciated that owner device 1448 may be used by an owner to access an application or a website that enables owner device to communicate with management system 1404 to request a teleoperator to operate robotic assistant 1412 and to obtain video 1446'.

An owner of a robotic assistant may provide configuration information, including privacy-related instructions or constraints, to a management system. The management system may access the configuration information provided by an owner when the owner requests a teleoperator to perform a task using a robotic assistant, and provide the configuration information to a teleoperations system used by the teleoperator.

Figure 15A:
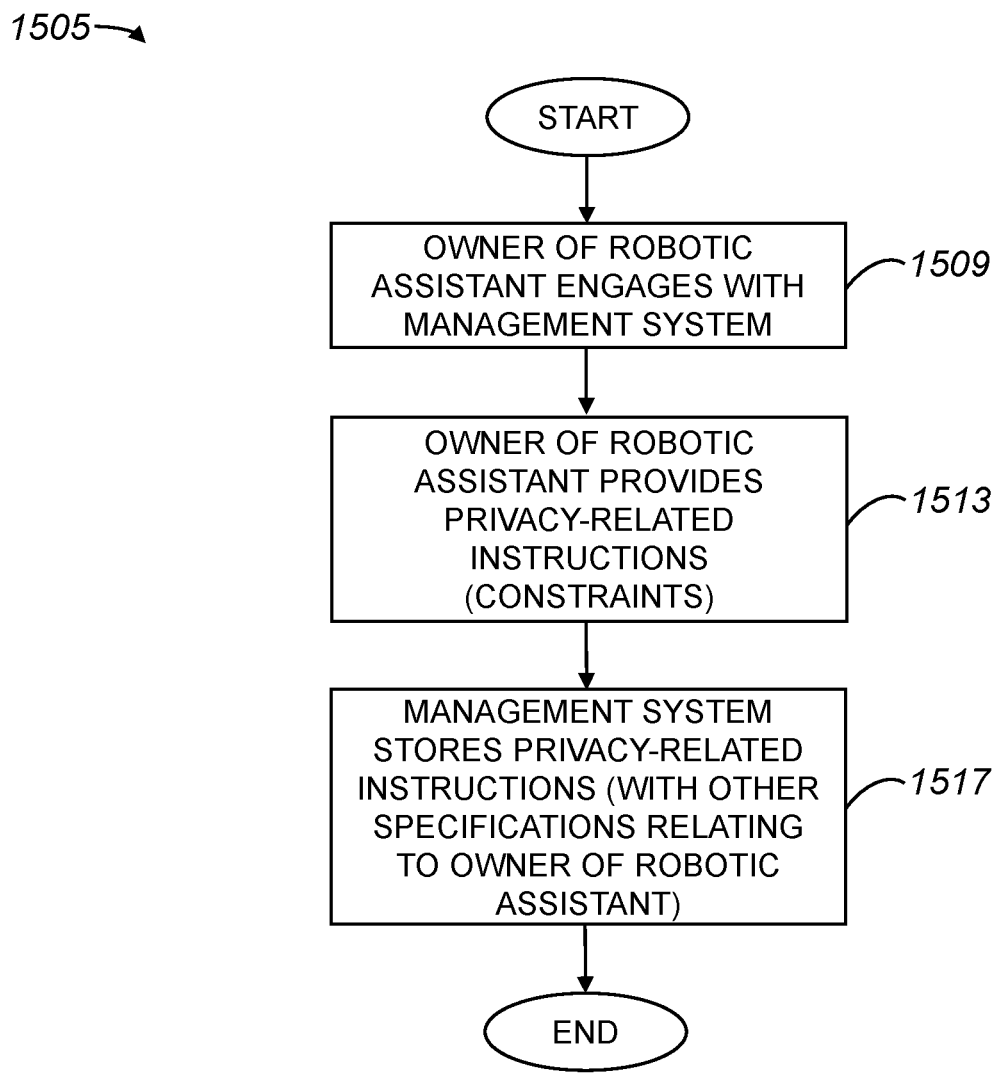
FIG. 15A is a process flow diagram which illustrates a method of an owner of a robotic assistant providing configuration information for use with the robotic assistant in accordance with an embodiment.

FIG. 15A is a process flow diagram which illustrates a method of providing configuration information for use with a robotic assistant in accordance with an embodiment. A method 1505 of providing configuration information for use with a robotic assistant begins at a step 1509 in which an owner of a robotic assistant engages with a management system. In one embodiment, the owner may access the management system to register the robotic assistant with the management system, and may subsequently access the management system to update information such as owner preferences.

In a step 1513, the owner provides privacy-related instructions or constraints to the management system. For example, the owner specifies any areas and/or objects, if any, which are to be obfuscated from the view of a teleoperator operating the robotic assistant. The owner may also specify how areas and/or objects are to be obfuscated. Methods of providing privacy-related instructions will be described with respect to FIGS. 15B and 15C.

Once the owner provides privacy-related instructions, the management system stores the privacy-related instructions in a step 1517. In general, the management system may store the privacy-related instructions with other specifications relating to the owner of the robotic assistant. Upon storing the privacy-related instructions, the method of providing configuration information for use with a robotic assistant is completed.

Figure 15B:
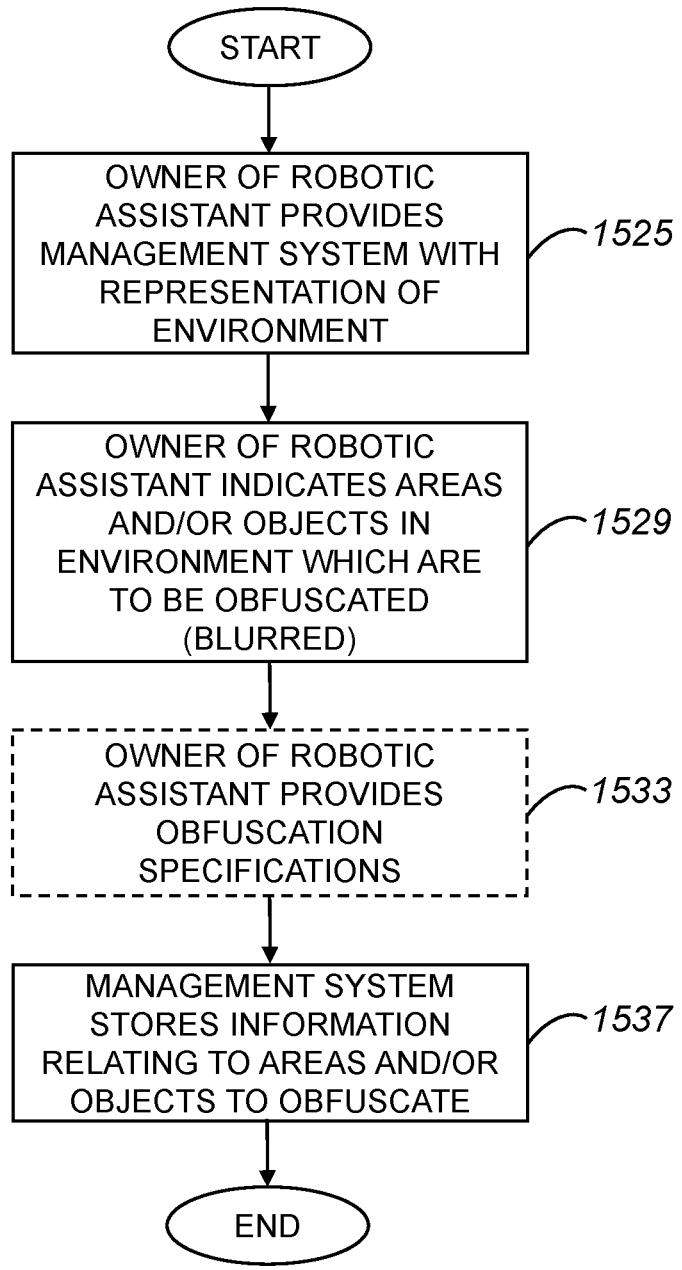
FIG. 15B is a process flow diagram which illustrates a first method of an owner of a robotic assistant providing privacy-related instructions, e.g., step 1513 of FIG. 15A, in accordance with an embodiment.

Referring next to FIG. 15B, one method of providing privacy-related instructions, e.g., step 1513 of FIG. 15A, will be described in accordance with an embodiment. A first method 1513' of providing privacy-related instructions begins at a step 1525 in which an owner of a robotic assistant provides a management system with a representation of an environment, i.e., the environment in which the robotic assistant is intended to operate. The owner may provide the representation using any suitable method. Suitable methods include, but are not limited to including, providing images of the environment, providing a sketch of the environment, and/or providing a description of the environment. In one embodiment, sensors such as one or more cameras on the robotic assistant may be used by the owner to capture images of the environment.

In a step 1529, the owner indicates areas and/or objects in the environment which are to be obfuscated from the view of a teleoperator using a teleoperations system. The areas and/or objects may be indicated, for example, but identifying the areas and/or objects shown or otherwise depicted an image of the environment. In addition, areas and/or objects may be indicated by providing a description of types of areas and/or objects which are to be obscured from the view of a teleoperator. By way of example, the owner may specify that the faces of any individual who appears in the environment are to be substantially hidden.

From step 1529, process flow proceeds to an optional step 1533 in which the owner may provide obfuscation specification. That is, the owner may determine how specific areas and/or objects may be obfuscated from the view of a teleoperator. For example, the owner may specify whether to blur specific areas and/or objects, replace specific areas and/or objects with generic images, or replace specific areas and/or objects with images selected by the owner.

In a step 1537, the management systems stores information relating to the areas and/or objects. The stored information may be retrieved as needed, as for example when a teleoperator takes control of the robotic assistant. Once the information relating to the objects and/or areas is stored, the first method of providing privacy-related instructions is completed.

Figure 15C:
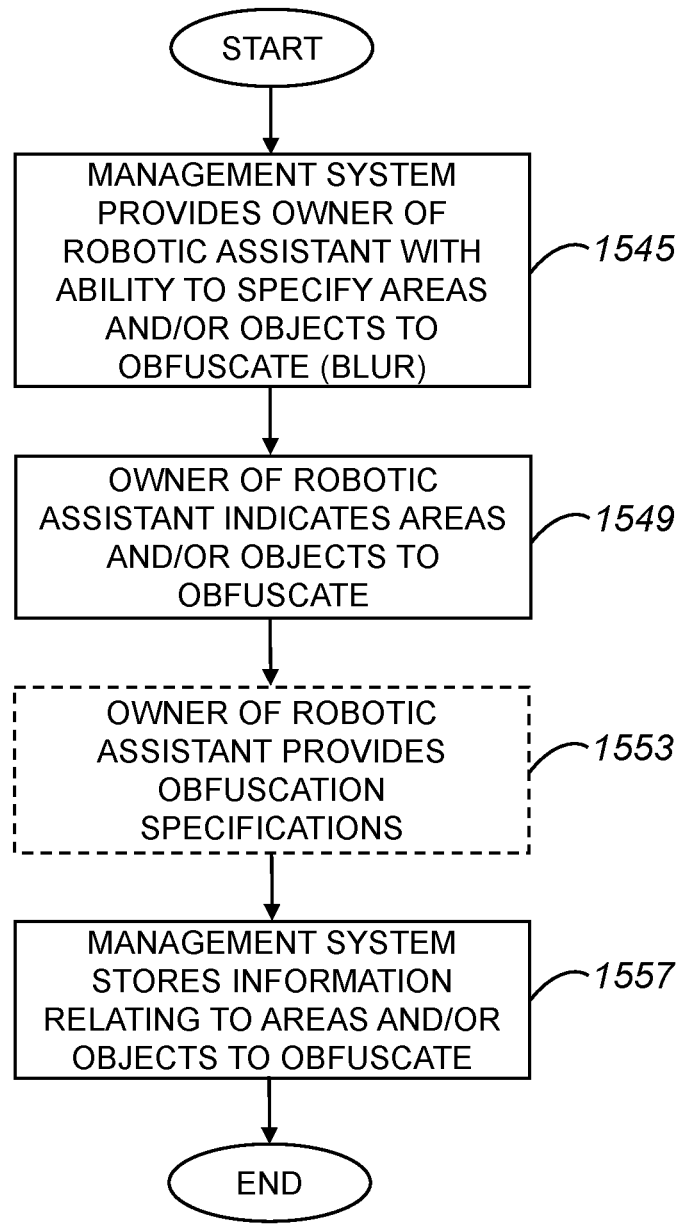
FIG. 15C is a process flow diagram which illustrates a second method of an owner of a robotic assistant providing privacy-related instructions, e.g., step 1513 of FIG. 15A, in accordance with an embodiment.

In lieu of an owner of a robotic assistant providing a representation of an environment to a management system, a management system may instead prompt the owner to specify types of areas and/or objects to obfuscate when presented to a teleoperator. With reference to FIG. 15C, a method of providing privacy-related instructions, e.g., step 1513 of FIG. 15A, in which a management system prompts an owner of a robotic assistant to provide instructions will be described in accordance with an embodiment. A second method 1513″ of providing privacy-related instructions begins at a step 1545 in which a management system provides an owner of a robotic assistant with an ability to specify areas and/or objects to obfuscate when a teleoperator is remotely operating the robotic assistant. The management system may effectively request that the owner indicate which types of areas and which types of objects to obfuscate.

Once the management system provides the owner with the ability to specify areas and/or objects to obfuscate, the owner indicates areas and/or objects to obfuscate in a step 1549. In an optional step 1553, the owner may provide obfuscation specification. That is, the owner may indicate how types of areas and/or objects are to be obfuscated. The management system stores information relating to the areas and/or objects to obfuscate in a step 1557, and the second method of providing privacy-related instructions is completed.

Although only a few embodiments have been described in this disclosure, it should be understood that the disclosure may be embodied in many other specific forms without departing from the spirit or the scope of the present disclosure. By way of example, within a framework that includes robotic assistants and human assistants, a customer may specifically request that a task be performed by either a robotic assistant or a human assistant. In other words, while a framework may support both robotic assistants and human assistants, a user or subscriber to the framework may specify whether he or she wishes for a requested task to be performed by a robotic assistant via teleoperations or performed by a human assistant.

A robotic assistant may generally be any robot which may operate, or be operated, to perform a task. For instance, a robotic assistant may be a home robot or a personal robot assistant which operates within a home to perform chores such as cleaning and cooking, provide entertainment, and/or provide security. A robotic assistant may also be a warehouse robot which may pick up goods, move goods within a warehouse, and/or put down goods.

As mentioned above, certain areas and/or objects in the environment within which a robotic assistant may be controlled by a teleoperator may be obscured from the view of the teleoperator, e.g., due to privacy and/or security concerns. The areas and/or objects may be blurred when rendered to a teleoperator, or the areas and/or objects may be replaced by images or icons. It should be appreciated that the size of the images or icons may be arranged to be similar to the size of the areas and/or objects which are to be obscured. For example, if an object that is to be obscured from view is a book with a visible title, the book may be obscured by a block of a similar size.

In one embodiment, areas and/or objects which are to be obscured from the view of a teleoperator which is operating a robotic assistant may be substantially replaced or substituted in the view with particular objects, e.g., objects specified by an owner of the robotic assistant. The same replacement object, which may be sized differently depending upon the size of the area and/or object that is to be obscured, may be used. Alternatively, different replacement objects may be substantially assigned to each area and/or object type.

The embodiments may be implemented as hardware, firmware, and/or software logic embodied in a tangible, i.e., non-transitory, medium that, when executed, is operable to perform the various methods and processes described above. That is, the logic may be embodied as physical arrangements, modules, or components. For example, the systems of an autonomous vehicle, as described above with respect to FIG. 3, may include hardware, firmware, and/or software embodied on a tangible medium. A tangible medium may be substantially any computer-readable medium that is capable of storing logic or computer program code which may be executed, e.g., by a processor or an overall computing system, to perform methods and functions associated with the embodiments. Such computer-readable mediums may include, but are not limited to including, physical storage and/or memory devices. Executable logic may include, but is not limited to including, code devices, computer program code, and/or executable computer commands or instructions.

It should be appreciated that a computer-readable medium, or a machine-readable medium, may include transitory embodiments and/or non-transitory embodiments, e.g., signals or signals embodied in carrier waves. That is, a computer-readable medium may be associated with non-transitory tangible media and transitory propagating signals.

The steps associated with the methods of the present disclosure may vary widely. Steps may be added, removed, altered, combined, and reordered without departing from the spirit of the scope of the present disclosure. Therefore, the present examples are to be considered as illustrative and not restrictive, and the examples are not to be limited to the details given herein, but may be modified within the scope of the appended claims.

What is claimed is:

1. A method comprising:
obtaining a request to remotely operate a robotic assistant, the robotic assistant including at least one sensor configured to collect data associated with an environment around the robotic assistant;
identifying a first teleoperations system to remotely operate the robotic assistant in response to the request, the first teleoperations system being one of a plurality of teleoperations systems;
assigning the first teleoperations system to remotely operate the robotic assistant; and
implementing at least one privacy-related instruction with respect to the first teleoperations system.

2. The method of claim 1 wherein the at least one sensor configured to collect data is configured to obtain at least one image of the environment, and wherein the at least one privacy-related instruction is an instruction relating to a rendering of the image such that at least a portion of the image is obfuscated when displayed on a visual interface of the first teleoperations system.

3. The method of claim 1 wherein identifying the first teleoperations system includes:
identifying a task to be completed by the robotic assistant, the task being specified in the request; and
determining whether the first teleoperations system is suited to remotely operate the robotic assistant to perform the task, wherein each teleoperations system of the plurality of teleoperations systems is configured to remotely operate the robotic assistant.

4. The method of claim 3 wherein determining whether the first teleoperations system is suited to remotely operate the robotic assistant to perform the task includes determining whether a first operator associated with the first teleoperations system has skills to remotely operate the robotic assistant to perform the task.

5. The method of claim 1 wherein implementing at least one privacy-related instruction with respect to the first teleoperations system includes providing the at least one privacy-related instruction to the first teleoperations system on a network.

6. The method of claim 1 wherein the environment is a first location, and wherein the first teleoperations system is located at a second location and assigning the first teleoperations system to remotely operate the robotic assistant includes a management system assigning the first teleoperations system to remotely operate the robotic assistant, the management system being separate from the teleoperations system and separate from the robotic assistant.

7. Logic encoded in one or more tangible non-transitory, computer-readable media for execution and when executed operable to:
   obtain a request to remotely operate a robotic assistant, the robotic assistant including at least one sensor configured to collect data associated with an environment around the robotic assistant;
   identify a first teleoperations system to remotely operate the robotic assistant in response to the request, the first teleoperations system being one of a plurality of teleoperations systems;
   assign the first teleoperations system to remotely operate the robotic assistant; and
   implement at least one privacy-related instruction with respect to the first teleoperations system.

8. The logic of claim 7 wherein the at least one sensor configured to collect data is configured to obtain at least one image of the environment, and wherein the at least one privacy-related instruction is an instruction relating to the rendering of the image such that at least a portion of the image is obfuscated when displayed on a visual interface of the first teleoperations system.

9. The logic of claim 7 wherein the logic operable to identify the first teleoperations system is operable to:
   identify a task to be completed by the robotic assistant, the task being specified in the request; and
   determine whether the first teleoperations system is suited to remotely operate the robotic assistant to perform the task, wherein each teleoperations system of the plurality of teleoperations systems is configured to remotely operate the robotic assistant.

10. The logic of claim 9 wherein the logic operable to determine whether the first teleoperations system is suited to remotely operate the robotic assistant to perform the task is operable to determine whether a first operator associated with the first teleoperations system has skills to remotely operate the robotic assistant to perform the task.

11. The logic of claim 7 wherein the logic operable to implement at least one privacy-related instruction with respect to the first teleoperations system is operable to provide the at least one privacy-related instruction to the first teleoperations system on a network.

12. A framework comprising:
   a plurality of robotic assistants, the plurality of robotic assistants including a first robotic assistant located at a first location associated with an owner of the first robotic assistant;
   a plurality of teleoperations systems, the plurality of teleoperations systems including a first teleoperations system; and
   a management system, the management system arranged to obtain at least one request to remotely operate the first robotic assistant, the management system further arranged to assign the first teleoperations system to remotely operate the first robotic assistant and to provide the first teleoperations system with at least one privacy-related instruction associated with the first robotic assistant.

13. The framework of claim 12 wherein the first robotic assistant includes at least one sensor configured to provide image data of the first location to the first teleoperations system, and wherein the at least one request includes a task to be performed by the first robotic assistant, the first robotic assistant configured to provide the image data as the first teleoperations system remotely operates the first robotic assistant to perform the task.

14. The framework of claim 13 wherein the first teleoperations system includes a visual interface configured to render the image data, and wherein the at least one privacy-related instruction causes at least one item depicted in the image data to be obfuscated when the image data is rendered.

15. The framework of claim 14 wherein the at least one item depicted in the image is obfuscated by substituting the at least one item with a replacement object when the image data is rendered.

16. The framework of claim 12 wherein the first robotic assistant is configured to operate autonomously at the first location, and wherein the management system obtains the at least one request to remotely operate the first robotic assistant from the first robotic assistant when the first robotic assistant encounters an issue while operating autonomously.

17. The framework of claim 12 wherein the first location is an indoor location, and wherein the first teleoperations system is located at a second location, the first teleoperations system being configured to provide commands to the first robotic assistant on a network.

18. The framework of claim 17 wherein the privacy-related instruction defines a geofenced area at the indoor location, wherein the first teleoperations system operates the first robotic assistant within the geofenced area.

19. The framework of claim 17 wherein the first robotic assistant includes at least one sensor configured to provide image data of the indoor location to the first teleoperations system on the network, and wherein the first teleoperations system includes a visual interface configured to render the image data, the privacy-related instruction being configured to identify at least one selected from a group including an area, an object, and an individual at the indoor location that is to be obfuscated when the image data is rendered on the visual interface.

20. The framework of claim 19 further including a device, the device being associated with the owner of the first robotics device, wherein the management system obtains the image data and provides the image data to the device.

* * * * *